(12) United States Patent
Jäckel et al.

(10) Patent No.: US 6,213,270 B1
(45) Date of Patent: Apr. 10, 2001

(54) APPARATUS FOR DAMPING TORSIONAL VIBRATIONS

(75) Inventors: Johann Jäckel, Baden-Baden (DE); Daniel Niess, Strassburg (FR)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/128,646

(22) Filed: Aug. 4, 1998

(30) Foreign Application Priority Data

Aug. 4, 1997 (DE) ............................................. 197 33 723
Feb. 28, 1998 (DE) ............................................. 198 08 647

(51) Int. Cl.[7] ............................. F16D 13/68; F16D 23/00
(52) U.S. Cl. ..................................... 192/70.17; 192/55.61
(58) Field of Search ............................. 192/70.17, 55.61, 192/89.23; 74/574

(56) References Cited

U.S. PATENT DOCUMENTS

| | | | |
|---|---|---|---|
| 4,739,866 | * 4/1988 | Reik et al. | 192/70.17 |
| 4,901,596 | * 2/1990 | Reik et al. | 74/574 |
| 5,069,321 | * 12/1991 | Reik et al. | 192/70.17 |
| 5,622,087 | * 4/1997 | Schierling et al. | 192/55.61 X |
| 5,622,245 | * 4/1997 | Reik et al. | 192/55.61 X |
| 5,673,598 | * 10/1997 | Duclos | 192/70.17 X |
| 5,732,810 | * 3/1998 | Schulz-Andres | 192/89.23 X |
| 5,826,689 | * 10/1998 | Bochot | 192/70.17 |

* cited by examiner

Primary Examiner—Charles A Marmor
Assistant Examiner—Roger Pang
(74) Attorney, Agent, or Firm—Darby & Darby

(57) ABSTRACT

Apparatus for damping torsional vibrations in the power train of a motor vehicle has two coaxial flywheels one of which is driven by the engine and the other of which can transmit torque to the input shaft of a transmission by way of a friction clutch. The flywheels are rotatable relative to each other against the resistance of a damper. Certain features of the apparatus reside in the dimensioning and distribution of its parts in the radial and axial directions of the flywheels to reduce the dimensions of the apparatus. The torque transmitting connection between at least one pair of neighboring rotary parts of the apparatus employs a slip clutch which yields when the applied torque exceeds a certain value. An intermittently or continuously active hysteresis device is utilized to operate in parallel with the energy storing springs of the damper.

77 Claims, 9 Drawing Sheets

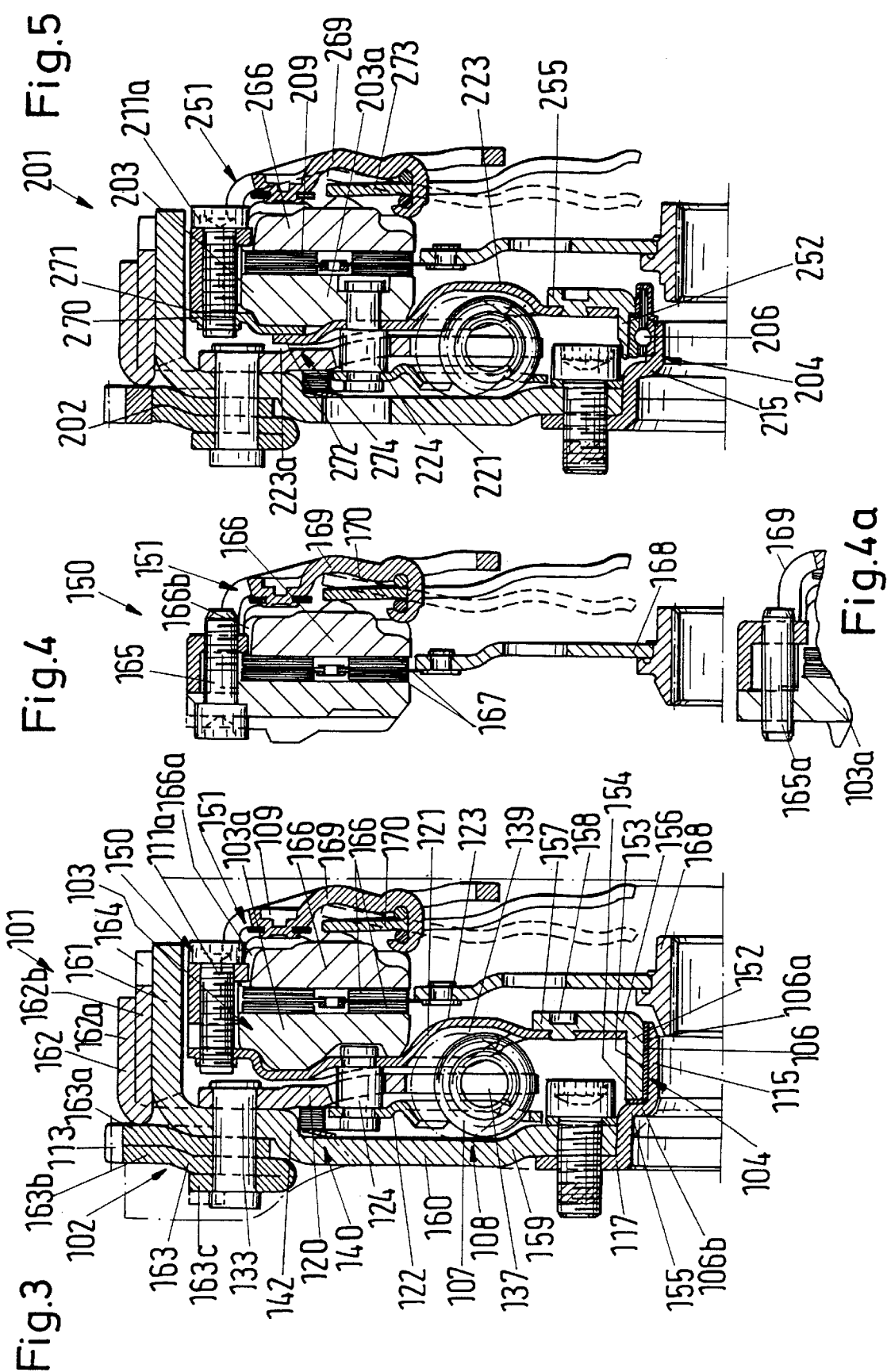

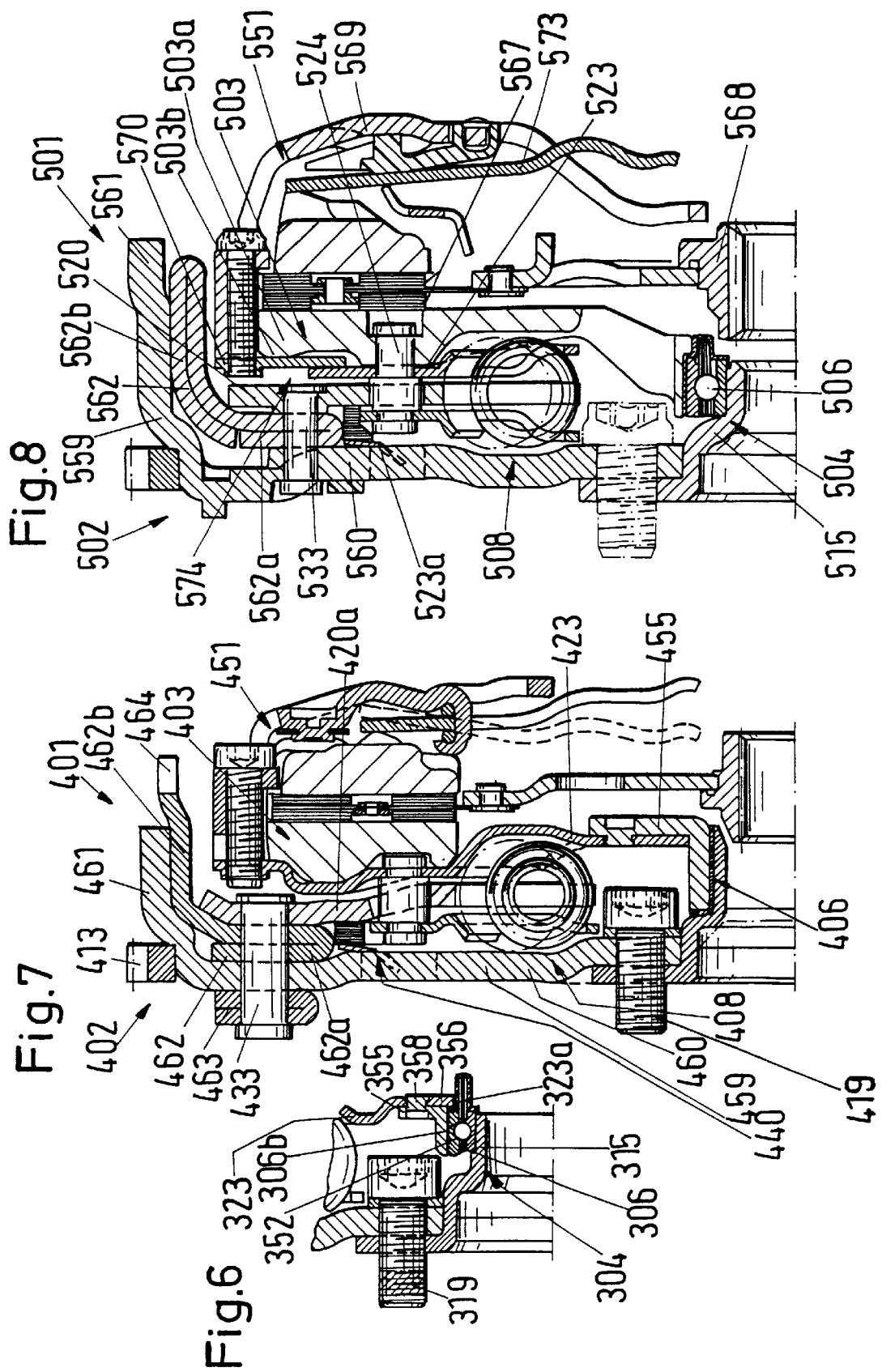

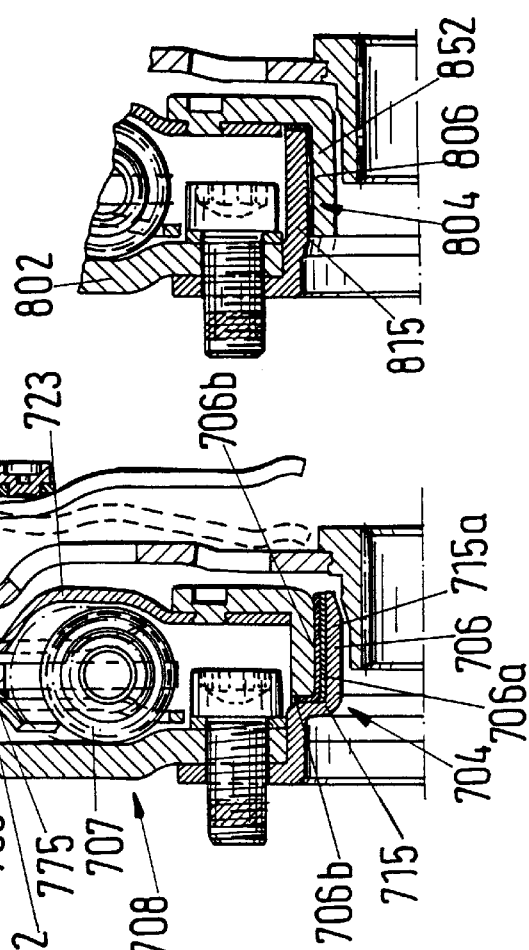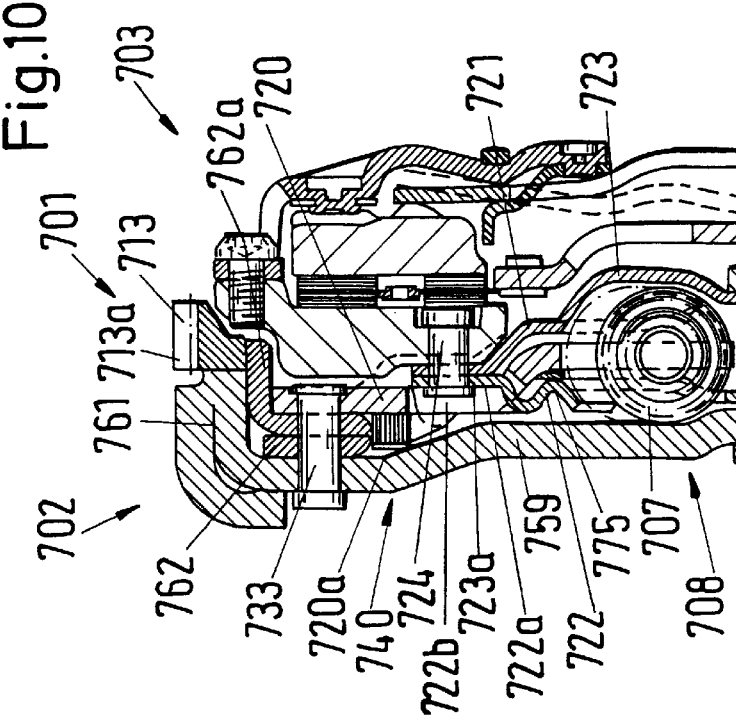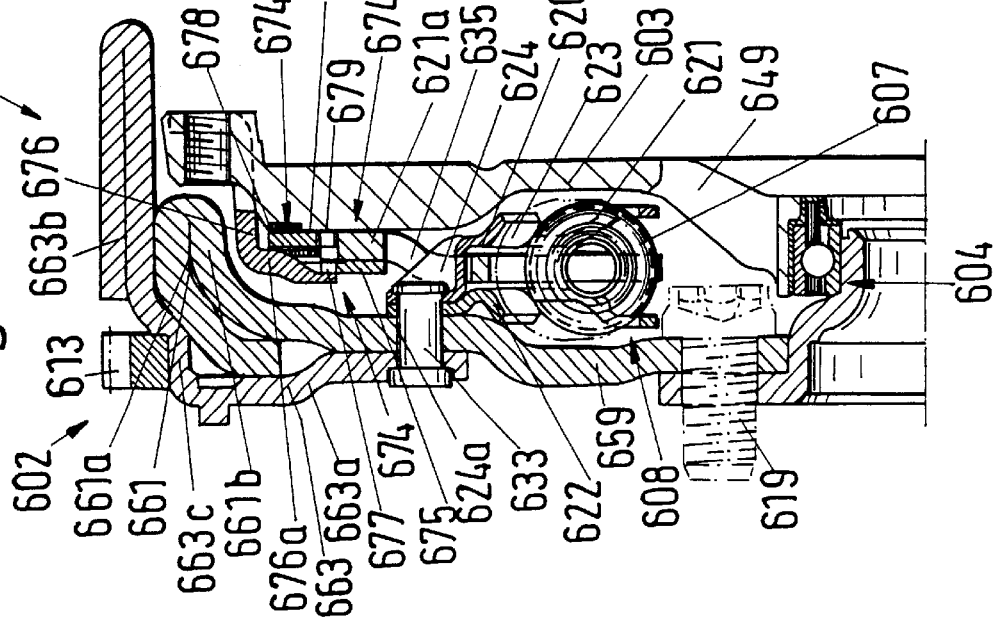

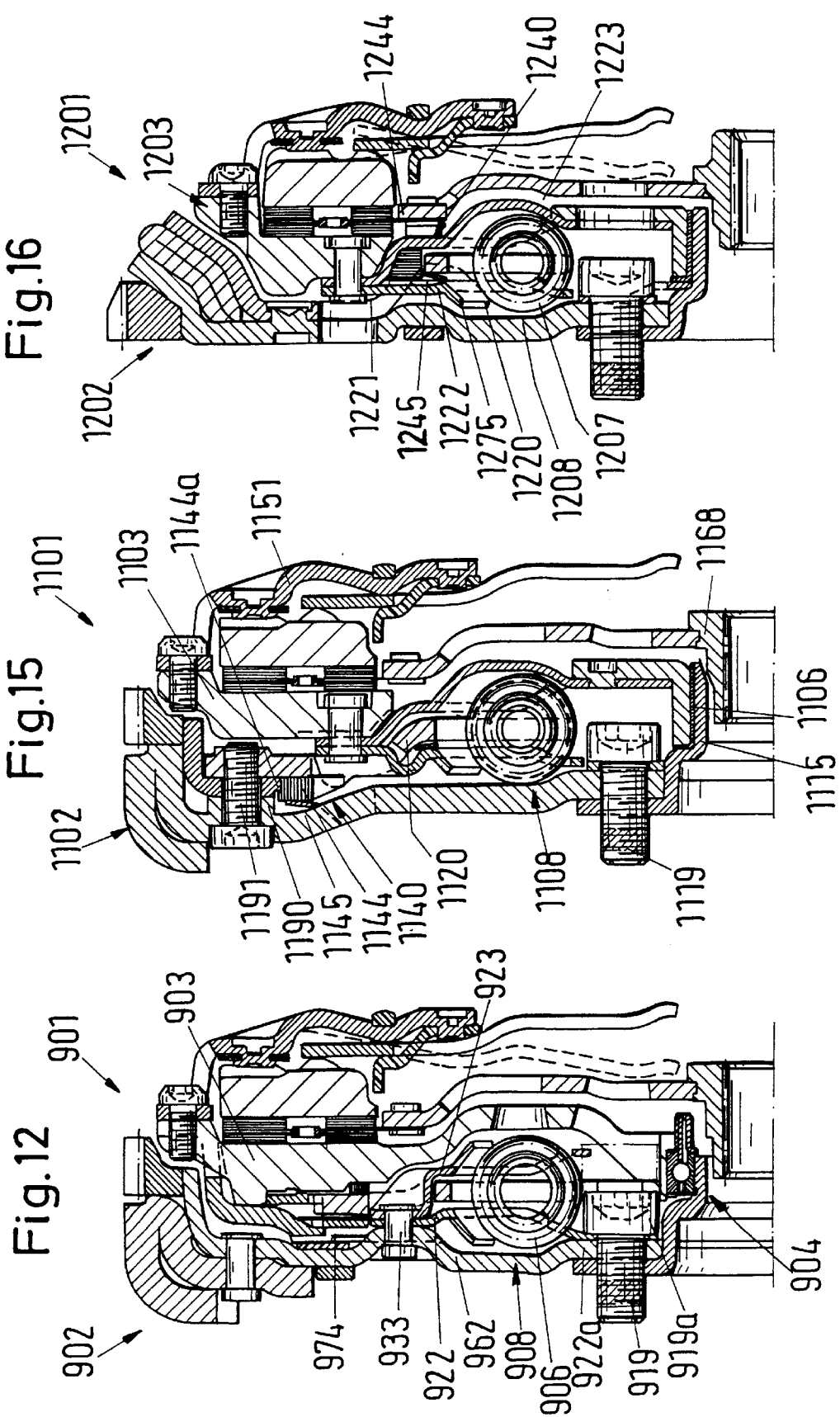

Fig.13
Fig.13a
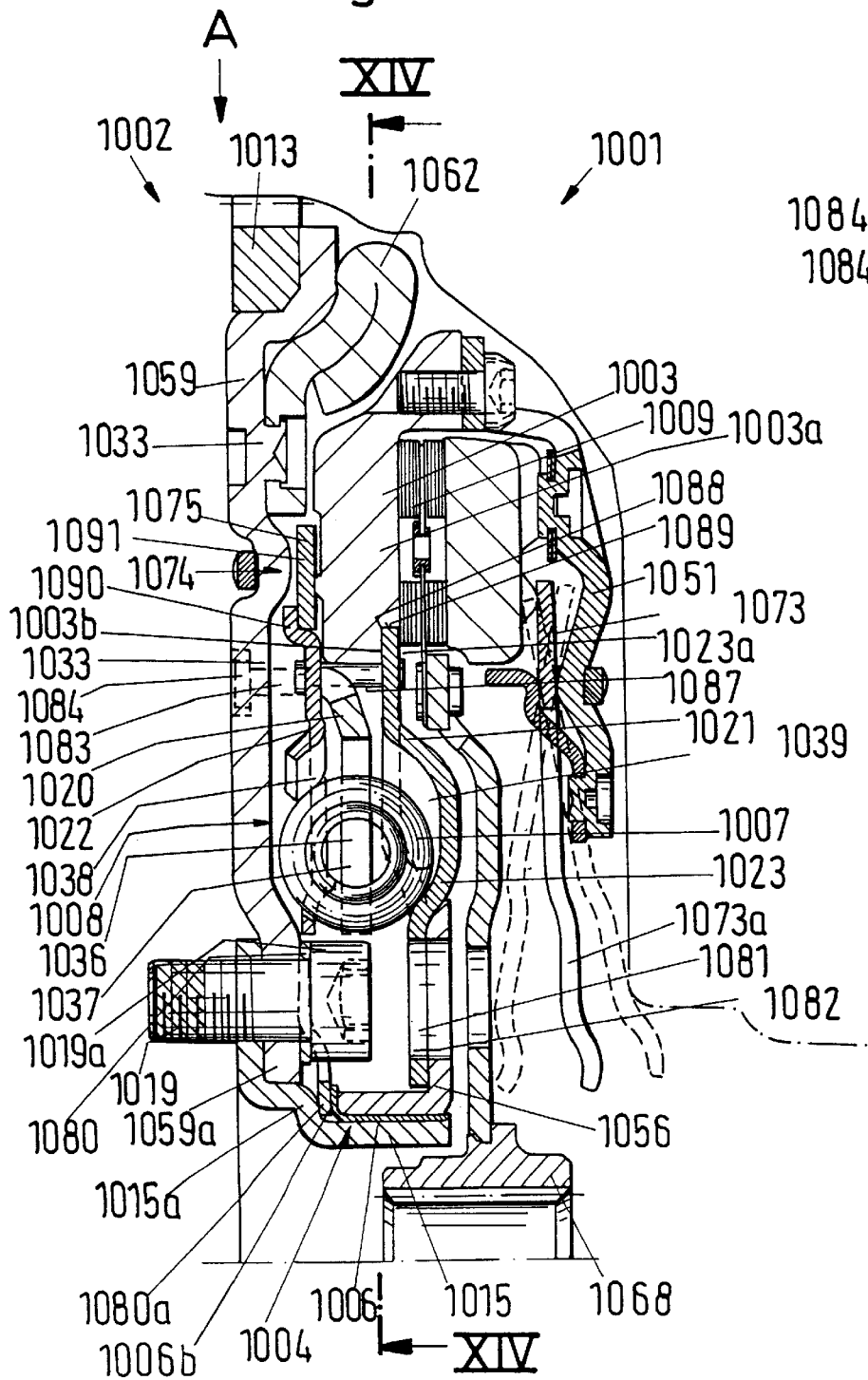
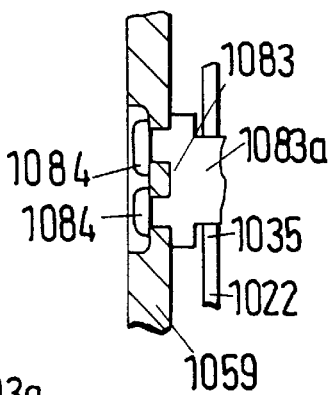

APPARATUS FOR DAMPING TORSIONAL VIBRATIONS

BACKGROUND OF THE INVENTION

The present invention relates to improvements in apparatus for damping torsional vibrations. More particularly, the invention relates to improvements in torsional vibration damping apparatus of the type wherein rotation of input and output members with each other is desirable (or at least acceptable) but angular movements of such members relative to each other (especially beyond a certain range of such angular movements) are undesirable or even damaging.

It is known to utilize torsional vibration damping apparatus in the power trains of motor vehicles, e.g., between the rotary output component of an internal combustion engine (or another suitable prime mover) and the input component (e.g., a flywheel) of an automated or manually engageable and disengageable friction clutch which, in turn, serves to transmit variable torque to the rotary input component of a manually shiftable or automated or automatic variable-speed transmission.

A drawback of many presently known torsional vibration damping apparatus is that they are bulky, complex and expensive. This creates serious problems in the power trains of numerous types of motor vehicles. Moreover, the assembly of conventional torsional vibration damping apparatus at the locale of use (such as an automobile assembly plant) is often a time-consuming procedure involving numerous welding, riveting, shape-altering, centering and/or other operations which contribute to the cost of the power plant and of the entire motor vehicle. Still further, it is normally necessary to establish and maintain supplies of large numbers of different spare parts.

OBJECTS OF THE INVENTION

An object of the invention is to provide a torsional vibration damping apparatus which is simpler, more compact and less expensive than, but just as reliable and versatile as, heretofore known apparatus.

Another object of the invention is to provide a novel torsional vibration damping apparatus which can be utilized with particular advantage in the power trains of passenger cars and/or other types of motor vehicles.

A further object of the invention is to provide a torsional vibration damping apparatus which can be utilized with particular advantage in the power trains of compact or miniature motor vehicles.

An additional object of the invention is to provide a torsional vibration damping apparatus which can stand long periods of extensive use and wear, i.e., an apparatus whose useful life is longer (or even much longer) than that of presently known and utilized torsional vibration damping apparatus.

Still another object of the invention is to provide a torsional vibration damping apparatus which is constructed and assembled in such a way that none of its parts must be immersed in a lubricant or another fluid medium in order to be capable of standing long periods of extensive use in the power train of a motor vehicle or elsewhere.

A further object of the invention is to provide a highly effective torsional vibration damping apparatus which is superior to numerous heretofore known apparatus and which can be installed in existing power trains as a superior substitute for conventional torsional vibration damping apparatus.

Another object of the invention is to provide a novel and improved modular torsional vibration damping apparatus.

An additional object of the invention is to provide a torsional vibration damping apparatus which can be assembled, either to a large extent or even practically entirely, at the manufacturing plant in lieu of at the locale of ultimate use.

Still another object of the invention is to provide novel and improved modules for use in the above outlined torsional vibration damping apparatus.

A further object of the invention is to provide novel and improved damper means for use in the above outlined torsional vibration damping apparatus.

Another object of the invention is to provide novel and improved methods of assembling torsional vibration damping apparatus for use in the power trains of motor vehicles.

An additional object of the invention is to provide a power train which embodies the above outlined torsional vibration damping apparatus.

Still another object of the invention is to provide novel and improved connections between various constituents of the improved torsional vibration damping apparatus, such as between the input and output members and the elements of a damper which operates between the input and output members.

A further object of the invention is to provide the apparatus with novel and improved means for limiting the magnitude of torque which can be transmitted from a prime mover to a transmission or the like.

Another object of the invention is to provide novel and improved input and output members for use in the above outlined torsional vibration damping apparatus.

An additional object of the invention is to provide the apparatus with novel and improved means for centering its input and output members relative to each other.

Still another object of the invention is to provide a novel and improved distribution of component parts which contributes to compactness of the improved apparatus as seen in the axial and/or in the radial direction of its rotary constituents.

A further object of the invention is to design the various constituents of the apparatus in such a way that its fasteners and/or other removable or separable or exchangeable parts are readily accessible to standard tools.

SUMMARY OF THE INVENTION

The invention resides in the provision of an apparatus for damping torsional vibrations, particularly in the power trains of motor vehicles. The improved apparatus comprises rotary input and output members which are arranged to carry out rotary movements with and relative to each other, particularly about a common axis, and at least one damper which operates between and is arranged to oppose at least some (e.g., predetermined stages of) rotary movements of the input and output members relative to each other. The damper comprises at least one energy storing device, e.g., a straight or arcuate coil spring or a set of interfitted coil springs.

It is preferred to provide the input and output members with suitable flywheels or sets of flywheels. Thus, the input member can include or constitute a primary flywheel which can be driven by the output component (such as a camshaft or a crankshaft) of an internal combustion engine, and the output member can comprise or constitute a secondary flywheel which can serve to transmit torque to the input element of a transmission, e.g., by way of a friction clutch.

The damper of such apparatus is or can be arranged to oppose at least some rotary movements of the primary and secondary flywheels relative to each other.

If the output member is to drive the input shaft of a transmission by way of a friction clutch, the secondary flywheel can be provided with an annular friction surface which faces away from the input member and the clutch can comprise a pressure plate, a clutch disc between the friction surface of the secondary flywheel and the pressure plate, and means (e.g., a clutch spring which can constitute a diaphragm spring) for moving the pressure plate relative to the friction surface between a plurality of different axial positions in at least one of which the pressure plate causes the clutch disc to bear against the friction surface and to thus receive torque from the secondary flywheel, i.e., from the output member. The clutch disc can transmit torque to the input shaft of the transmission.

The damper can comprise at least one rotary input element serving to receive torque from the primary flywheel, and a rotary output element which is rotatable relative to the at least one input element and can serve to transmit torque to the secondary flywheel. The at least one energy storing device of the damper is then interposed between portions of the at least one input element and of the output element to yieldably oppose rotation of the at least one input element and the output element relative to each other. Such apparatus can further comprise a first torque transmitting connection between the input member and the at least one input element of the damper and a second torque transmitting connection between the output element of the damper and the output member. The at least one energy storing device can be located at a first radial distance from the common axis of the input and output members, and each of the two connections can be located at a greater second radial distance from such axis.

The just described embodiment of the improved apparatus can further comprise a frictional connection between at least one of the flywheels and (a) the at least one input element or (b) the output element. Alternatively, one can provide a form-locking connection between one of the flywheels and the at least one input element or between one of the flywheels and the output element of the damper.

A first torque transmitting connection can be provided between the input member and the at least one input element, and a second torque transmitting connection can be provided between the output element and the output member. One of these connections can be installed at a first radial distance, and the other of these connections can be installed at a different second radial distance from the common axis of the input and output members.

It is also possible to provide a frictional connection between one of the flywheels and the respective element of the damper, and a form-locking connection between the other flywheel and the other element of the damper; the form-locking connection can be disposed at a first radial distance, and the frictional connection can be disposed at a greater second radial distance from the common axis.

The apparatus can further comprise means for limiting the magnitude of the torque which can be transmitted between the primary and secondary flywheels, and such torque limiting means can include a frictional connection between one of the flywheels and the respective (input or output) element of the damper.

The torque transmitting connection between the rotary output component of the prime mover and the input member (such connection can include a set of externally threaded axially parallel fastening elements) can be placed nearer to the common axis than the energy storing device or devices of the damper, i.e., the torque transmitting connection can be disposed at a first radial distance from the common axis, and the spring or springs of the damper can be installed at a greater second radial distance from such axis.

The apparatus can further comprise at least one radial bearing (such as a journal bearing or an antifriction bearing with one or more annuli of rolling elements between two races) to serve as a means for centering the flywheels relative to each other; such centering means can be located at a first radial distance from the common axis of the flywheels, and the aforementioned fastening means between the output component of the prime mover and the input member can be located at a greater second radial distance from the axis.

One element (such as the input element) of the damper can comprise two annular parts or cheeks which are non-rotatably connected to each other, and the other element of the damper (such as the output element) can comprise a disc-shaped part (hereinafter called flange for short); at least a portion of the flange can be located between the two cheeks, as seen in the direction of the common axis of the input and output elements of the damper (such common axis preferably coincides with the common axis of the flywheels). A portion of at least one of the cheeks can form part of the centering means (such as the aforementioned radial bearing) which is installed between the two flywheels. For example, at least one of the cheeks or the flange can include a substantially cylindrical member (e.g., a sleeve or a ring) which constitutes or can constitute the radially innermost portion of the at least one cheek or of the flange and forms part of the means for centering the flywheels relative to each other. Such substantially cylindrical portion can be said to constitute an axially extending portion of the bearing and to form part of the centering means. Such part of the centering means can constitute a separately produced part which is affixed to the input or output element of the damper.

The means for centering the two flywheels relative to each other can form part of the input member or of the output member; such centering means can include an axially extending portion of the input or output member. Such part of the centering means can constitute a separately produced part which can be affixed to the primary flywheel or to the secondary flywheel.

A suitable hysteresis device (hereinafter called hysteretic damping device) can be utilized to operate between the two flywheels, preferably in parallel with the at least one energy storing device of the damper. For example, the hysteretic damping device can include or constitute a friction generating device. In accordance with one presently preferred embodiment, the at least one energy storing device of the damper is located at a first radial distance from the common axis of the flywheels, and the hysteretic damping device can be located at a greater second radial distance from such axis.

In accordance with another presently preferred embodiment, the connection between the primary flywheel and the input element of the damper can be disposed at a first radial distance from the common axis of the flywheels, the connection between the output element of the damper and the secondary flywheel is located at a second radial distance from the common axis, and the hysteretic damping device is located at a third radial distance from the common axis; the first radial distance can be greater or less than the second radial distance, and the third radial distance is preferably greater than one but less than the other of the first and second radial distances.

Alternatively, the just discussed third radial distance (of the hysteretic damping device from the common axis) can be greater than the first as well as the second radial distance.

If the hysteretic damping device comprises a friction generating device, the latter can be set up to generate a hysteresis which varies in response to rotation of the input and output members relative to each other.

The radially outermost portion of the means for fastening the input member to the rotary output component of the prime mover can be placed at a predetermined distance from the common axis of the input and output members, and the radially innermost portion of the aforementioned flange of the damper can be located at a second radial distance from the common axis; such second radial distance preferably at least equals but can exceed the predetermined distance. The flange can be provided with at least one window for a portion of the at least one friction generating device of the damper; this window can be provided at (such as in or close to) the radially innermost portion of the flange, and the window can have an open side facing radially inwardly, i.e., toward the common axis of the flywheels.

The radially innermost portion of at least one cheek of the damper can be disposed at a radial distance from the axis which at least equals but can exceed the aforementioned predetermined distance (of the radially outermost portion of the fastening means for the input member) from such axis.

In lieu of (or in addition to) providing one or more windows for the energy storing device or devices in the flange, it is possible to provide such window or windows in at least one cheek of the damper.

The flange of the damper can be provided with one or more openings radially outwardly of the energy storing device or devices; such opening or openings provide room for the passage of one or more fastener means serving to fixedly secure the two cheeks of the damper to each other. The opening or openings of the flange can extend circumferentially of the input and output elements of the damper.

The primary flywheel can include a wall which extends radially of the common axis of the two flywheels; a radially outer portion of the flange can be placed next to and can be fixedly connected with such wall by suitable fastener means. Those portions of the wall and of the flange which are located radially inwardly of the fastener means can be spaced apart from each other to provide room for a portion of or for an entire hysteretic damping device. Distancing means can be interposed between the wall and the flange, at least in the region of the fastener means; such distancing means can comprise an annular mass.

A multi-stage torque limiting connection can be installed between one of the input and output elements of the damper and one of the primary and secondary flywheels.

The apparatus can comprise a module which includes the secondary flywheel, the pressure plate of the aforementioned friction clutch (which can be used to transmit torque from the secondary flywheel to the input shaft of the transmission in a power train), and a clutch disc which can be positioned between the secondary flywheel and the pressure plate and has a hub connectable with the input shaft of the transmission. The module can be mounted on the output element of the damper.

If the improved apparatus comprises or cooperates with a friction clutch, that side of the secondary flywheel which faces away from the primary flywheel can be provided with the aforementioned friction surface which is or which can be located at a predetermined radial distance from the common axis of the flywheels. If such apparatus further comprises torque limiting means, the latter can be placed at or close to such predetermined distance from the common axis.

The torque limiting means can operate between the input and output members of the improved apparatus and can include means for generating slip torque. Such torque generating means can include a resilient element which is arranged to store at least some energy in response to connection of the friction clutch with the secondary flywheel. The resilient element can comprise or constitute a diaphragm spring.

One of the flywheels can be provided with at least one opening affording access to and manipulation of suitable fastening means serving to secure the output element of the damper to the other flywheel. Such fastening means can comprise one or more rivets. The other flywheel can constitute the secondary flywheel and is then normally provided with the aforementioned friction surface for engagement by the friction linings of the clutch disc which transmits torque to the input shaft of the transmission. The opening or openings of the one flywheel are or can be provided at such radial distance from the common axis of the flywheels that they overlap the friction surface of the secondary flywheel (as seen in the direction of the common axis of the flywheels).

The distribution of various constituents of the improved torsional vibration damping apparatus in the radial direction of the common axis of the flywheels can be such that (a) the aforementioned radial bearing between the flywheels is located at a first radial distance from the common axis, (b) the means for fastening the input member (e.g., the primary flywheel) to the rotary output component of a prime mover is located at a greater second radial distance from the axis, (c) the at least one energy storing device of the damper is located at a greater third radial distance from the axis, (d) the torque limiting means an/or the hysteretic damping device is located at a greater fourth radial distance from the axis, and (e) at least one axial extension of the primary flywheel is located at a fifth radial distance greater than the fourth radial distance from the common axis.

The radially outer portion of the primary flywheel can include at least one annular mass, particularly a mass having several layers of folded sheet material, especially a metallic sheet material. The aforementioned radial wall of the primary flywheel can be of one piece with the annular mass; this wall can be provided with one or more openings for fastening means which serves to secure the input member to the rotary output constituent or component of a prime mover. In lieu of being of one piece with the annular mass, the radial wall can constitute a separately produced part; the input member then further comprises means for securing the annular mass to the radially outer portion of the wall. The annular mass which constitutes or is carried by the radially outermost portion of the primary flywheel can support or can be made of one piece with a starter gear. Alternatively, or in addition to the starter gear, the annular mass at the radially outer portion of the primary flywheel can carry or can be made of one piece with suitable engine management indicia (for example, such indicia can be tracked by one or more speed monitoring and/or other sensors).

If at least one of the two flywheels is movable axially relative to the other flywheel, the hysteretic damping device (which preferably operates in parallel with the energy storing device or devices of the damper) can include at least one resilient element (e.g., a diaphragm spring) which is arranged to bias the at least one flywheel axially toward the other flywheel.

In lieu of forming part of the aforediscussed module (which includes at least some constituents of the friction clutch), the secondary flyweel can form part of a module which further includes the damper and is connectable with the primary flywheel. Such module can include or encompass one or more additional parts, such as the aforementioned friction clutch including the clutch disc which is insertable between a pressure plate of the friction clutch and the friction surface of the secondary flywheel. The friction clutch can be mounted on or otherwise carried by the secondary flywheel.

The aforementioned hysteretic damping device can be designed in such a way that it comprises at least one friction ring which is surrounded by a portion of the input member or output member. Alternatively, the hysteretic damping device can comprise friction generating elements (e.g., an annular array of such elements) confined by a suitable annular guide surface which surrounds and guides the friction generating elements and can have its center on the common axis of the flywheels.

The means for limiting the magnitude of the torque which can be transmitted between the input and output members can comprise at least one resilient element (such as a diaphragm spring) which is stressed in the axial direction of the flywheels to assist the clutch spring (such clutch spring can constitute or include a second diaphragm spring). Suitable means can be provided for affixing the resilient element of the torque limiting means to the clutch housing.

If the apparatus includes a module composed of or including the secondary flywheel, a friction clutch adjacent the friction surface of the secondary flywheel, and a clutch disc between the friction surface and the clutch, the housing of the clutch can be secured to the secondary flywheel or to the damper by fastener means which are accessible at one side of the secondary flywheel, namely the side located opposite the friction surface and confronting the primary flywheel. The fastener means can comprise external threads receivable in tapped bores of the clutch housing. Depending upon the interpretation of the term "friction clutch", the clutch disc can be considered as a component part of such clutch or as a discrete part.

It is also possible to mount the fastener means for securing the clutch housing to the output member (e.g., to the secondary flywheel) in such a way that the constituents (e.g., bolts or screws or the like) are accessible for insertion or removal at the friction surface side of the secondary flywheel. The fastener means can be parallel to the common axis of the flywheels.

At least one of the normally two cheeks forming part of the input element of the damper can be safely secured to the primary flywheel by two connecting means, namely a first connecting means located radially outwardly of the energy storing device or devices of the damper, and a second connecting means located radially inwardly of such energy storing device or devices. The first connecting means can comprise one or more rivets, and the second connecting means can further serve as the aforementioned means for securing the input member (e.g., the primary flywheel) to the rotary output component of the prime mover.

In accordance with one presently preferred embodiment of the damper, the latter comprises several (particularly five) energy storing devices forming an annular array spacedly surrounding the common axis of the flywheels. Each such energy storing device can be located at or at least close to the same radial distance from the common axis.

The torque limiting device of the improved apparatus can be installed to operate between the output element of the damper and the secondary flywheel. If a clutch is being utilized in such apparatus, it is attachable to and detachable from the secondary flywheel. The torque limiting means can comprise at least one resilient element (such as a diaphragm spring) which is stressed in the direction of the common axis of the flywheels in response to attachment of the friction clutch to the secondary flywheel, and which is caused or permitted to dissipate at least some energy in response to detachment of the clutch from the secondary flywheel.

It has been found that, regardless of whether utilized individually or in any one of a number of different combinations with each other, the aforediscussed features contribute to simplicity, reliability, compactness (both in the direction of the common axis of the primary and secondary flywheels and in a direction at right angles to such axis) and numerous other advantages of the improved torsional vibration damping apparatus as well as of the power train which cooperates with or embodies such apparatus.

The novel features which are considered as characteristic of the invention are set forth in particular in the appended claims. The improved torsional vibration damping apparatus itself, however, both as to its construction and the mode of assembling, installing and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 3 is a fragmentary axial sectional view of a second torsional vibration damping apparatus;

FIG. 4 is a fragmentary axial sectional view of a third apparatus;

FIG. 4a is a fragmentary axial sectional view of a detail in a torsional vibration apparatus constituting a modification of the apparatus including the structure of claim 4;

FIG. 5 is a fragmentary axial sectional view similar to that of FIG. 3 but showing certain relevant details of a further apparatus;

FIG. 6 is a fragmentary axial sectional view of certain details in a further torsional vibration damping apparatus;

FIG. 7 is a fragmentary axial sectional view similar to that of FIGS. 3 or 5 but showing relevant details of still another apparatus;

FIG. 8 is a fragmentary axial sectional view similar to that of FIGS. 3, 5 or 7 but showing certain features of anitiona an additional apparatus;

FIG. 9 is a fragmentary axial sectional view of a further apparatus;

FIG. 10 is a similar fragmentary axial sectional view of an additional apparatus;

FIG. 11 is an axial sectional view of a detail in still another torsional vibration damping apparatus;

FIG. 12 is a fragmentary axial sectional view of a further apparatus;

FIG. 13 is a fragmentary axial sectional view of an additional apparatus;

FIG. 13a is a greatly enlarged view of a detail in the structure of FIG. 13;

FIG. 15 is a fragmentary axial sectional view of certain details in another apparatus;

FIG. 16 is a similar fragmentary axial sectional view of a further apparatus.

DESCRIPTION OF PREFERRED EMBODIMENTS

Figure 1:
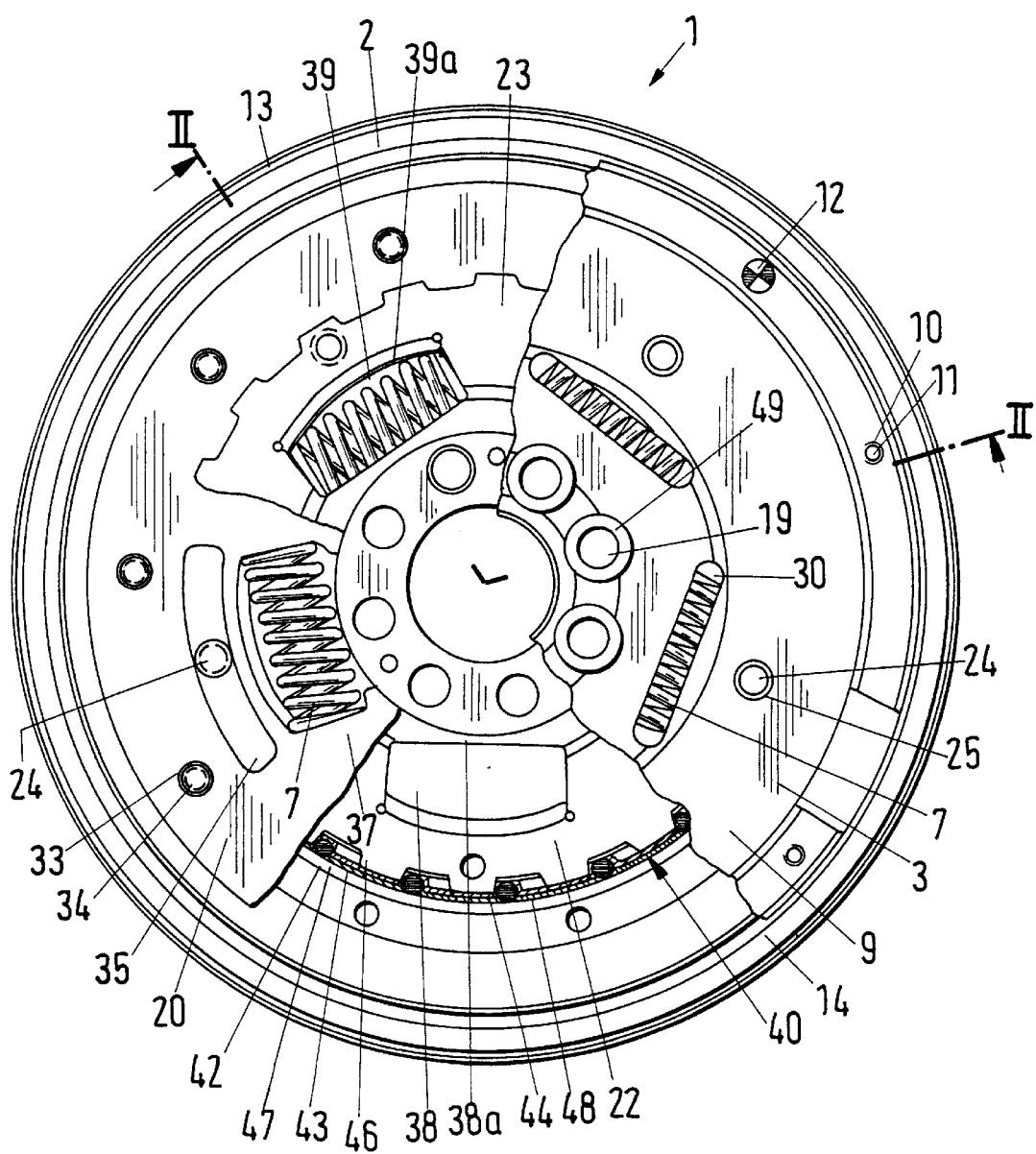
FIG. 1 is a front elevational view of a torsional vibration damping apparatus which embodies one form of the invention, with certain parts broken away.
Figure 2:
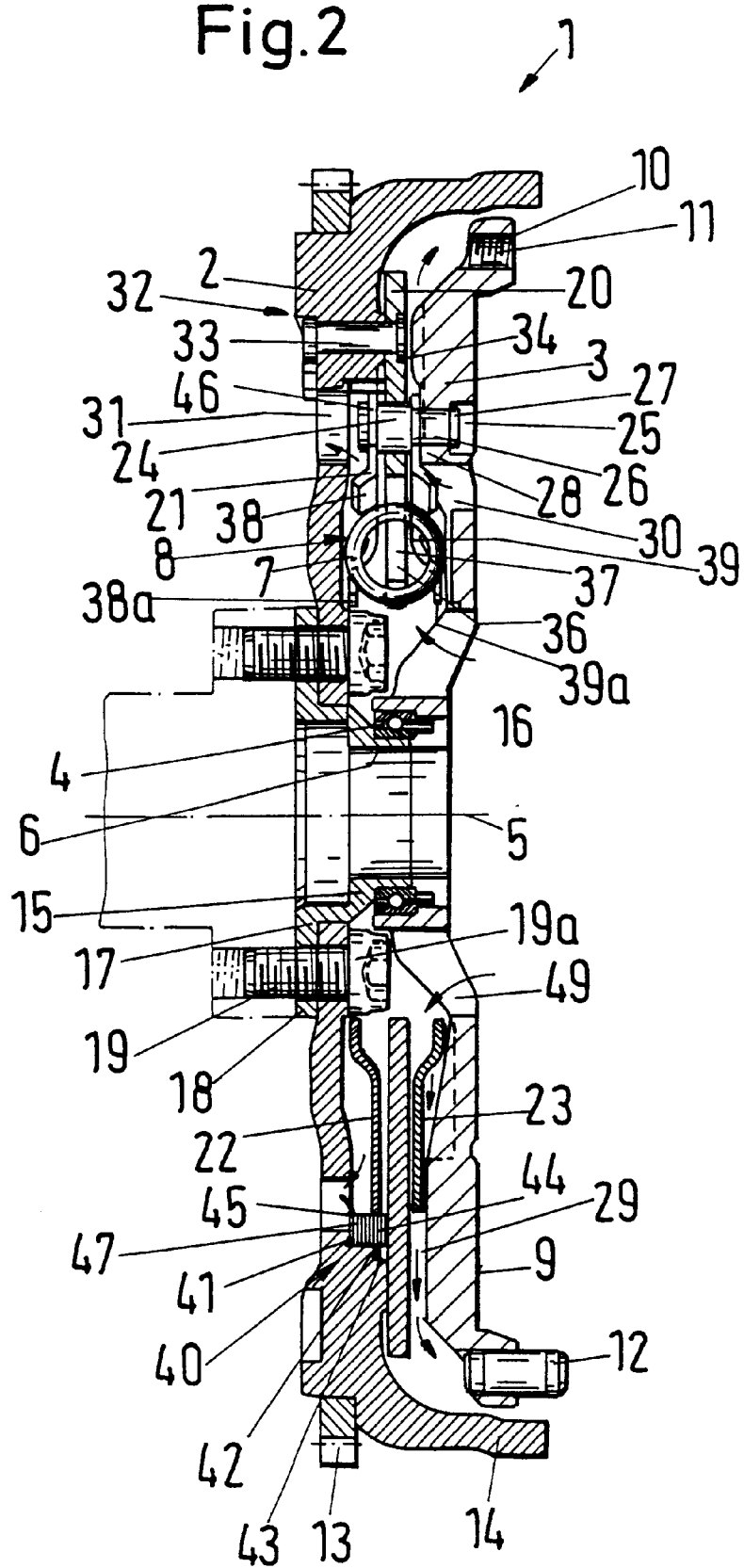
FIG. 2 is a sectional view substantially as seen in the direction of arrows from the line II—II in FIG. 1.

FIGS. 1 and 2 illustrate a portion of a first torsional vibration damping apparatus 1 which is a so-called twin-mass flywheel including input and output members which are rotatable with as well as relative to each other about a common axis 5. The input member of the apparatus 1 comprises a first flywheel or primary flywheel 2, and the output member of the apparatus comprises a second or secondary flywheel 3. The primary flywheel 2 is separably connected or connectable to the rotary output component (such as a camshaft or a crankshaft) of a prime mover, not shown, e.g., an internal combustion engine in a motor vehicle, by suitable fastener or fastening means 19. The illustrated fastening means comprises eight screws or bolts 19 which are parallel to the axis 5, which are located at the same radial distance from such axis, and which are equidistant from each other as seen in the circumferential direction of the primary flywheel 2. A portion of the output component of the prime mover is shown in FIG. 1 by dot-dash lines. The secondary flywheel 3 can transmit torque to the input shaft of a manual or automated transmission of the power train, for example, by way of a suitable friction clutch or the like; this will be described in greater detail with reference to FIG. 3. For example, the apparatus 1 can be utilized in lieu of the torsion damping apparatus which is disclosed in commonly owned U.S. Pat. No. 5,151,065 granted Sep. 29, 1992 to Paul Maucher et al. for "TORSION DAMPING APPARATUS FOR USE WITH FRICTION CLUTCHES IN THE POWER TRAINS OF MOTOR VEHICLES". The disclosure of each and every patent and/or application identified in this specification is incorporated herein by reference.

The means 4 for centering the flywheels 2, 3 so that they can rotate with and relative to each other about the common axis 5 comprises a suitable bearing 6, e.g., a combined radial and axial (thrust) bearing which comprises or can comprise one or more annuli of spherical or otherwise configurated rolling elements between two races (not shown).

The apparatus 1 further comprises a damper 8 including an input element which can receive torque from the primary flywheel 2, an output element which can transmit torque to the secondary flywheel 3, and a set of five energy storing devices 7 in the form of elongated coil springs. The illustrated coil springs 7 are staight, equidistant from each other (as seen in the circumferential direction of the flywheels, and are disposed at the same radial distance from the axis 5. It is also possible to employ arcuate coil springs having centers of curvature on the axis 5.

The secondary flywheel 3 is assumed to form part of a friction clutch, e.g., a friction clutch of the type shown at 151 in FIG. 3 or an analogous clutch. Therefore, the right-hand side of the flywheel 3 (as viewed in FIG. 2) is provided with a friction surface 9 which faces away from the primary flywheel 2 and is engaged by the friction linings of a clutch disc (see the friction linings 166 of the clutch disc 168 shown in FIG. 3) when the clutch is engaged. The friction surface 9 has the customary shape of one side of a washer and is provided on or close to the radially outer portion of the secondary flywheel 3. The radially outermost portion 10 of the flywheel 3 has axially parallel tapped bores 11 for the externally threaded shanks of fasteners in the form of bolts or screws serving to separably connect the flywheel 3 with the housing or casing (not shown) of the friction clutch (see the housing or casing 169 of the clutch 151 shown in FIG. 3).

The radially outermost portion 10 of the flywheel 3 further carries axially parallel locating or centering pins 12 (only one shown in each of FIGS. 1 and 2) portions of which are snugly received in suitable recesses, bores or holes of the clutch housing to facilitate and simplify predictable assembly of the flywheel 3 with the friction clutch.

The illustrated flywheels 2 and 3 are solid masses made of a suitable metallic material; for example, these flywheels can constitute metallic castings. However, and as will be fully explained hereinafter in connection with the detailed description of several modified apparatus (for example, those shown in FIGS. 3, 5, 7 and 8), it is also possible to make at least one of the flywheels of a suitable sheet material (e.g., metallic sheet stock) which is deformed to provide several suitably deformed layers extending in the direction of and/or at right angles to the common axis of the flywheels.

The radially outer portion of the primary flywheel 2 carries a starter gear 13 which can be welded, soldered or otherwise securely affixed thereto. Furthermore, the radially outermost portion of the flywheel 2 is provided with an axially parallel (annular) extension 14 which contributes to the mass of the primary flywheel and surrounds the radially outermost portion 10 of the secondary flywheel 3.

The radially innermost portion of the radially extending wall of the primary flywheel 2 carries an axially extending sleeve-like member 15 which forms part of the centering means 4 and is surrounded by the inner race of the antifriction bearing 6. The outer race of this bearing is received in a cylindrical recess 16 provided in the radially innermost portion of the secondary flywheel 3. The member 15 is a separately produced part 17 having a radially outwardly extending collar 18 which overlies the exposed left-hand side of the radially extending wall of the flywheel 2 (as viewed in FIG. 2) and is affixed thereto by the aforementioned fasteners 19. In other words, such fasteners perform the dual function of securing the flywheel 2 to the output component of the prime mover and of securing the member 15 to the flywheel 2. However, it is equally within the purview of the invention to make the part 17 (or a similar part, e.g., without the sleeve 18) of one piece with the radially extending wall of the primary flywheel 2.

The shanks of the fasteners 19 extend through registering holes of the collar 18 and the radially innermost portion of the radial wall of the flywheel 2, and the heads 19a of these fasteners bear against the inner side of the radial wall to thus clamp the sleeve 18 between the flywheel 2 and the output component of the prime mover.

In accordance with a further modification (not specifically shown), the separate part 17 can be dimensioned and configurated in such a way that the collar 18 is located at the right-hand side of the radial wall of the primary flywheel 2 (as viewed in FIG. 2) so that, when the fasteners 19 are tightened, their heads 19a bear directly against the collar 18 and urge the latter against the adjacent side of the radially innermost portion of the radial wall of the flywheel 2. The utilization of the just described modified separately produced part (replacing the illustrated part 17) might necessitate certain changes in the configuration of the adjacent portion of the primary flywheel and/or in the configuration of certain other (neighboring) parts of the apparatus 1.

The input element of the damper 8 is constituted by or includes a substantially radially extending disc-shaped or flange-like part 20 (hereinafter called flange for short), and the output element 21 of the damper 8 comprises two annular parts 22, 23 (hereinafter called cheeks for short) which are disposed at opposite sides of the flange 20 (as seen in the direction of the common axis 5 of the flywheels 2 and 3). As can be seen in FIG. 2, the radially outermost portion of the flange 20 extends beyond the radially outermost portions of the cheeks 22, 23.

The cheeks 22, 23 of the output element 21 of the damper 8 are maintained in the illustrated axially spaced-apart positions by suitable distancing elements 24. The illustrated distancing elements 24 are rivets having heads 27 abutting annular shoulders in axially parallel stepped bores 25 of the secondary flywheel 3. That side of the flywheel 3 which faces away from the friction surface 9 is immediately adjacent the cheek 23 which has holes registering with bores 25 of the flywheel 3 and receiving portions of the shanks of the rivets 24. As can be seen in each of FIGS. 1 and 2, portions of the bores 25 are provided in the friction surface 9 of the secondary flywheel 3, and the remaining portions of such bores are provided in the flywheel 3 immediately radially outwardly of the friction surface 9.

The left-hand side of the flywheel 3 (as viewed in FIG. 2) is provided with circumferentially extending grooves 28 which connect neighboring bores 25 to each other and communicate with substantially radially inwardly extending channels 29 which are adjacent the cheek 23 and establish paths for the circulation of coolant (such as atmospheric air). The channels 29 further communicate with inlet ports 30 which are provided in the flywheel 3 to admit coolant into the channels. Additional coolant can enter the open radially inner ends of the channels 29. Cooling of the apparatus 1 in the region of the cheek 23 is desirable and advantageous because the secondary flywheel 3 is apt to be heated to an elevated temperature in response to repeated engagement and disengagement of the friction clutch as well as when the clutch is only partially engaged so that the aforementioned friction linings of the clutch disc slip along the friction surface 9. Additional ports 31 are provided in the radial wall of the primary flywheel 2 to afford access to the adjacent portions of the rivets 24 as well as to admit additional coolant (atmospheric air) into the adjacent portions of the channels 29 or to permit the flow of heated air in the opposite direction. The directions of circulation of coolant in the apparatus 1 are shown in FIG. 2 by non-referenced arrows.

The locations (32) where the radially outermost portion of the flange 20 is affixed to the primary flywheel 2 are adjacent the radially outermost portion of the radial wall of the primary flywheel. The means for connecting the flange 20 to the flywheel 2 comprises rivets 33 which are located radially outwardly of the rivets 24. The heads at the right-hand axial ends of the rivets 33 (as viewed in FIG. 2) are confined in complementary recesses 34 of the flange 20; this contributes to a reduction of the axial length of the apparatus 1.

The sequence of steps involving the assembly of the apparatus 1 is preferably as follows: The first step involves the application of rivets 33 at 32, i.e., the establishment of a rigid torque-transmitting connection between the primary flywheel 2 and the flange 20 of the damper 8. The next step involves the establishment of rigid connections (at 28) between the cheek 23 and the secondary flywheel 3, i.e., the application of the rivets 24. Such operation is facilitated due to the provision of ports 31 in the primary flywheel 2.

FIG. 1 shows that the aforementioned coolant-admitting ports 30 of the flywheel 3 are actually elongated straight tangentially extending openings in register with (i.e., at the same radial distance from the axis 5 as) the elongated straight coil springs 7 of the damper 8. It has been found that, under many circumstances, the utilization of a damper having five equidistant springs 7 is particularly advantageous, i.e., the energy-storing capacity of five coil springs is highly satisfactory for use in many types of power trains. Thus, by utilizing five coil springs 7, the maker of the apparatus 1 can ensure that the flywheels 2 and 3 can turn relative to each other through an angle which is sufficiently large to guarantee a highly satisfactory torsional damping action. In addition, the number (five) of the springs 7 is sufficiently small to ensure that the mounting of such springs in the elements 20, 21 of the damper 8 does not unduly affect the stability of the flange 20 and/or of the cheeks 22, 23 even if these parts are not made of a material having a pronounced thickness or of a very expensive material which can stand pronounced deforming stresses when the apparatus 1 is called upon to transmit pronounced torques.

FIG. 1 shows that those heads of the rivets 24 which are remote from the heads 27 extend into elongated arcuate slots 35 provided in the flange 20 radially outwardly of the coil springs 7. These slots 35 extend along arcs (as seen in the circumferential direction of the flange 20) which equal or approximate the length of the ports 30. The extent of angular displacements of the flywheels 2 and 3 (i.e., of the input and output elements 20, 21) relative to each other is determined by the springs 7 as well as by the rivets 24. Thus, the flywheels 2, 3 can no longer turn relative to each other when the springs 7 are fully compressed so that the neighboring convolutions of each of these springs abut each other. Furthermore, the extent of angular displacement of the flywheels 2, 3 relative to each other is limited by the selected length of the arcuate slots 35 (as seen in the circumferential direction of the flange 20, i.e., each of the rivets 30 can be caused to move from the one end to the other end of the respective arcuate slot 35.

The flange 20 is provided with tangentially extending cutouts or windows 36 for portions of the coil springs 7. The radially inner portions of the windows 36 are open, i.e., such windows extend all the way into the radially innermost portion of the flange 20. Consequently, neighboring windows 36 are separated from each other by substantially radially extending arms or partitions 37. The radially innermost portion of the flange 20 extends close to the heads 19a of the fasteners 19, the same as the springs 7, i.e. (and as can be readily seen in each of FIGS. 1 and 2), each spring 7 is closely adjacent the nearest head 19a. This contributes to compactness of the apparatus 1 as seen in a direction radially of the axis 5.

The cheeks 22, 23 of the output element 21 of the damper 8 are respectively provided with windows 38, 39 for those portions of the springs 7 which extend in the axial direction of the apparatus 1 beyond the respective sides of the flange 20. As can be seen in FIG. 1, the windows 38, 39 do not extend all the way to the radially innermost portions of the respective cheeks 22, 23; they are separated from such radially innermost portions by narrow circumferentially extending webs or strips 38a, 39a. The webs 38a, 39a contribute to the strength of the respective cheeks 22, 23, i.e., relatively thin cheeks can stand the stresses which act upon the cheeks when the flywheels 2, 3 are caused to turn relative to each other whereby the flange 20 turns relative to the cheeks 22, 23 and/or vice versa. This causes the springs 7 to store energy or to store additional energy with attendant stressing of the parts 20, 22 and 23 in the circumferential direction of the flywheels.

However, it is also possible to employ cheeks having windows 38, 39 which are open radially inwardly, i.e., toward the axis 5. Much depends upon the magnitude of the torque which is to be transmitted by the apparatus 1, on the thickness of the cheeks 22, 23 and/or upon the material of which the cheeks are made.

The apparatus 1 further comprises a hysteretic damping device 40 which operates between the flywheels 2, 3 in parallel with the springs 7 of the damper 8. The illustrated hysteretic damping device 40 is a friction generating device which is disposed between the connecting means including the rivets 24 and the connecting means including the rivets 33, as seen in a direction radially of the axis 5. As seen in the direction of the axis 5, the hysteretic damping device 40 is located between the flange 20 and the adjacent portion 41 of the aforementioned radially extending wall of the primary flywheel 2.

The illustrated device 40 comprises a friction ring 44 surrounded by the adjacent ring-shaped portion 42 forming part of the primary flywheel 2 and having a narrow cylindrical surface 43 engaging the friction ring 44 to thus oppose rotation of the ring 44 and the primary flywheel relative to each other. The ring 44 can be replaced with an annulus of discrete radially onwardly extending tongues or shoes which bear upon the surface 43. FIG. 2 clearly shows that the device 40 is actually recessed into that side of the primary flywheel 2 which faces toward the secondary flywheel 3; this contributes to compactness of the apparatus 1 as measured in the direction of the common axis 5 of the two flywheels.

The just mentioned shoes which can be utilized in lieu of the ring 44 can be located immediately adjacent each other, i.e., they can differ from the ring 44 only in that they are not of one piece with each other. However, it is also possible to replace the ring 44 with an annulus of discrete circumferentially spaced apart shoes which are separated from each other by relatively narrow or even wider gaps not unlike the teeth of a spur gear.

An advantage of an annulus of discrete shoes (in lieu of the circumferentially complete ring 44) is that such shoes can bear upon the internal surface 43 of the primary flywheel 2 under the action of centrifugal force, i.e., with a force which varies in response to variations of the RPM of the flywheel 2. However, such desirable results can also be obtained by resorting to a split ring 44 or even by resorting to a circumferentially complete ring which is made of a material that permits at least some elastic radial expansion of the ring under the action of centrifugal force with attendant change in the frictional engagement between the one-piece ring 44 and the surface 43 in response to changes of the RPM of the flywheel 2.

The illustrated one-piece ring 44 is acted upon by a resilient element 45, preferably a diaphragm spring, which reacts against the primary flywheel, as at 41, and bears upon the ring 44 to urge the latter against the flange 20. In other words, the flywheel 2 and the flange 20 can turn relative to each other only by overcoming the frictional resistance of the ring 44 which bears upon the flange under the action of the diaphragm spring 45 and which also bears (or can bear) upon the internal surface 43 of the flywheel 2 under its own bias and/or under the action of centrifugal force.

It is clear that the mounting of the ring 44 and spring 45 of the device 40 can be such that the spring 45 reacts against the flange 20 and biases the ring 44 against the radial wall of the primary flywheel 2.

In the apparatus 1 of FIGS. 1 and 2, the ring 44 of the hysteretic damping device 40 is coupled with play to the cheek 22. As can be best seen in FIG. 1, the radially outermost portion of the cheek 22 is provided with a set of projections 46 which are spaced apart from each other in the circumferential direction of the cheek and cooperate with suitable projections or protuberances 47 of the friction ring 44. The distances between neighboring protuberances 47 (as seen in the circumferential direction of the flywheel 2) and the widths of the projections 46 (again as measured in the circumferental direction of the flywheel 2) are selected in such a way that the parts 22, 44 can turn relative to each other through relatively small angles corresponding to the clearances 48. An advantage of such dimensioning and distribution of the projections 46 and protuberances 47 is that the device 40 is ineffective when the flywheel 2 changes the direction of its rotation relative to the flywheel 3 and/or vice versa. It can be said that the device 40 generates a delayed friction whenever one of the flywheels 2, 3 is caused to change the direction of rotation relative to the other flywheel.

FIG. 1 shows that each of the two cheeks 22, 23 is provided with an annulus of projections 46. However, the projections 46 of the cheek 23 are not used; they are provided only because the two cheeks are identical in order to reduce the overall cost of the apparatus. The cheeks 22, 23 are mirror images of each other with reference to a plane which is perpendicular to the axis 5 and includes the flange 20.

If the structure which is shown in FIG. 2 is assembled into a module at the manufacturing plant (in order to shorten the time which is required to install the apparatus 1 in a power train at the automobile assembly plant), it is preferred to install the fasteners 19 in the module in such a way that they cannot be lost or misplaced. This can be readily achieved by dimensioning and shaping the heads 19a in such a way that the shanks of the fasteners 19 can be inserted into and can pass through the holes provided therefor in the radially extending wall of the flywheel 2 but that the shanks cannot be withdrawn from such holes once the flywheels 2, 3 and the elements 20, 21 of the damper 8 are properly connected to each other. FIGS. 1 and 2 show holes 49 which are provided in the radially inner portion of the secondary flywheel 3 in order to afford access to the heads 19a when the apparatus 1 is to be attached to the rotary output component of an engine in an automobile assembly plant.

In the apparatus 1 of FIGS. 1 and 2, the cheeks 22, 23 of the output element 21 of the damper 8 are secured to the secondary flywheel 3, and the input element (flange) 20 of the damper is affixed to the primary flywheel 2. However, it will be readily appreciated that the mode of operation of the apparatus 1 is not changed if the functions of the flange 20 and the cheeks 22, 23 are reversed, i.e., if the cheeks are affixed to the primary flywheel 2 to constitute the input element of the damper and the flange is affixed to the secondary flywheel 3 to constitute the output element of the thus modified damper.

It is equally possible to modify the apparatus 1 by mounting the rivets 33 radially inwardly of the rivets 24;

such modification is preferably accompanied by the utilization of two cheeks at least one of which extends radially outwardly beyond the flange; the outer diameter of the flange in the thus modified apparatus can be reduced. The slots 35 are then provided in at least one of the cheeks radially outwardly of the flange in order to provide room for angular movements of the input element (including the modified cheeks) and the output element (including the modified flange) relative to each other.

It is further possible to modify the apparatus 1 in such a way that the rivets 24 and 33 (or their equivalents) are installed at the same radial distance from the axis 5. It is then necessary to install the displaced rivets 24 and 33 in such a way that they alternate with each other as seen in the circumferential direction of the flywheels. Furthermore, it is then advisable to provide the cheeks and the flange with radially outwardly projecting arms, lugs or analogous extensions and to install the rivets 24, 33 or their equivalents in the region of such extensions. The positions of the extensions on the cheeks on the one hand and on the flange on the other hand must be such that the thus modified input and output elements of the damper are capable of turning relative to each other through angles which are required to take advantage of the ability of the energy storing devices 7 to permit a desired angular displacement of the two flywheels relative to each other.

FIGS. 1 and 2 show that the locations (at 10, 11 and 12) where the secondary flywheel 3 can be connected with the housing of a friction clutch (such as the friction clutch 151 of FIG. 3) are located radially outwardly of the connecting means including the rivets 28 and 33.

An important advantage of the apparatus 1 is that its space requirements in the direction of the axis 5 as well as at right angles to such direction are surprisingly small. As concerns the savings in space in a direction radially of the axis 5, they are attributable to several of the aforedescribed features regarding the distribution of various constituents of the apparatus. Thus, the bearing 6 of the centering means 4 is located radially inwardly of the annulus of fasteners 19 which serve to secure the primary flywheel 2 to the output component of a prime mover. Furthermore, the diameter of the bearing 6 is relatively small, and the heads 19a of the fasteners 19 are closely or immediately adjacent the outer race of the bearing 6. The placing of the two sets of rivets 24, 33 radially outwardly of the springs 7 also contributes to appreciable savings in space (as seen radially of the axis 5). Still further, the location for the hysteretic damping device 40 is also selected in such a way that it necessitates little (if any) additional space in the direction of as well as at right angles to the axis 5. This is achieved in that the device 40 is mounted radially inwardly of the rivets 33 and radially outwardly of the rivets 24 as well as in the aforementioned annular recess 42 of the primary flywheel 2.

Another advantage of the apparatus 1 is that the aforediscussed mounting of the device 40 with a large diameter renders it possible to generate a very pronounced frictional hysteresis without pronounced wear upon its component parts. The wear is low because the specific surface pressure and strain are relatively low due to the large diameter of the device 40. At any rate, such pressure and strain can be readily maintained within an acceptable range.

Referring to FIG. 3, there is shown a portion of a modified torsional vibration damping apparatus 101 having an input member including a primary flywheel 102 and an output member including a secondary flywheel 103. The two flywheels are rotatable with and relative to each other about a common axis (indicated by a dot-dash line) and are centered relative to each other by a centering means 104 including a combined radial and axial (thrust) bearing 106 including a cylindrical sleeve 106a one end portion of which is connected with and surrounded by a radially outwardly extending collar 106b. The sleeve 106a centers the adjacent portions of the bearings 102, 103 relative to each other in the radial direction of the common axis, and the collar 106b serves as a means for preventing axial movements of the flywheels relative to one another.

In FIG. 3, the collar 106b is of one piece with the sleeve 106a. However, it is equally possible to make the collar 106b as a separate part which is thereafter properly affixed to the sleeve 106a. In fact, it is equally possible to install the collar 106b (or an equivalent of this collar) at a location which is remote from the sleeve 106a, i.e., the centering means 104 can include discrete radial and axial bearings.

Still further, it is possible to install the 106a at a first radial distance and to install a discrete collar 106b at a different second radial distance from the common axis of the flywheels 102, 103. For example, the collar 106b can be installed between two parts one of which is affixed to the flywheel 102 and the other of which is affixed to the flywheel 103; these parts are designed to hold the collar 106b between them in such a way that the two flywheels are fixed in desired axial positions relative to each other.

The means for yieldably opposing at least some angular movements of the flywheels 102, 103 relative to each other comprises a damper 108. The damper 108 of FIG. 3 is similar to the damper 8 of FIG. 2; it comprises an input element 120 constituted by a flange having a radially outer portion connected to the flywheel 102 by rivets 133 so that the parts 102, 120 share all angular movements, and an output element 121 having two annular parts or cheeks 122, 123 nonrotatably affixed to the secondary flywheel 103. Rivets 124, which extend through arcuate slots of the flange 120, serve to non-rotatably connect the cheeks 122, 123 to each other for limited angular movement relative to the input element (flange) 120. In contrast to the rivets 24 in the apparatus 1 of FIGS. 1–2 (these rivets secure the cheeks 22, 23 to each other and to the secondary flywheel 3), the rivets 124 merely connect the cheeks 122, 123 for joint rotation about the axis of the flywheels 102, 103, and a discrete fastener means 111a (e.g., one or more screws, bolts or bolts and nuts) is employed to non-rotatably affix the cheek 123 to the secondary flywheel 103 as well as to the housing 169 of the aforementioned friction clutch 151. Actually, the fastener means 111a serves to connect the secondary flywheel 102 and the cheek 123 with a module 150 which includes the friction clutch 151. It will be noted that the connecting means including the rivets 124 is located radially inwardly of the connecting means including the rivets 133 as well as radially inwardly of the connecting means including the fastener means 111a. The radial distance of the rivets 133 from the common axis of the flywheels 102, 103 equals or approximates the radial distance of the fastener means 111a from such axis.

The cheek 123 is provided with pocket-shaped recesses 139 for portions of energy storing devices 107 forming part of the damper 108 and constituted by coil springs only one of which can be seen in FIG. 3. The pockets 139 extend in the axial direction as well as circumferentially of the flywheels 102, 103 and serve as retainers for or as a means for stressing the respective coil springs 107. In addition, the pockets 139 are preferably configured in such a way that they contribute to rigidity and stability of the cheek 123. Such reinforcement or stiffening of the cheek 123 enables the latter to actually carry the entire module 150. This module can be said to include the secondary flywheel 103, the friction clutch 151 and the clutch disc 168 (if the latter is considered a discrete component, i.e., not as a constituent of the friction clutch 151).

The radially inner portion of the cheek 123 includes a tubular extension 152 having a cylindrical internal surface 153 which surrounds the aforementioned sleeve 106a of the bearing 106 forming part of the centering means 104 for the flywheels 102 and 103. The extension 152 can be fixedly secured to or can slide relative to the sleeve 106a. The radially extending collar 106b of the bearing 106 is installed between a radially extending annular end face 154 of the sleeve-like extension 152 of the cheek 123 and a radially extending portion 155 of the part 117 corresponding to the part 17 in the apparatus 1 of FIGS. 1 and 2.

The tubular extension 152 is a separately produced part 156 having a substantially L-shaped cross-sectional outline and including a radially outwardly extending annular washer-like portion 157 affixed to the radially innermost portion of the cheek 123 by rivets 158. The illustrated rivets 158 constitute suitably deformed parts of the washer-like portion 157 and are reliably anchored in the adjacent portions of the cheek 123. The rivets 158 can be replaced by or utilized jointly with other types of connecting means; for example, the separately produced part 156 can be welded to the cheek 123.

The primary flywheel 102 includes a radially extending wall 160 which can be made of a suitable metallic sheet material and the radially inner portion of which is connected to the separately produced part 117, e.g., by the fasteners (one shown but not referenced) corresponding to the fasteners 19 of FIG. 2 and serving to connect the primary flywheel 102 with the rotary output component of a prime mover. The radially outermost portion of the wall 160 is of one piece with an axially extending annular radially outermost portion 161 of the primary flywheel 102.

The radially outer part of the wall 160 is offset relative to the radially inner part of such wall (as shown at 142) to provide room for a hysteretic damping device 140 which is or which can be identical with the device 40 in the apparatus 1 of FIGS. 1 and 2.

The annular radially outermost portion 161 of the primary flywheel 102 surrounds the module 150. A portion of such module can extend axially beyond the open side of the annular portion 161, i.e., in a direction axially of the flywheel 102, away from the radial wall 160 and out of the annular portion 161.

The inertia of the flywheel 102 can be increased by providing it with one or more auxiliary masses or flywheels. FIG. 3 shows a first auxiliary mass 162 which surrounds the portion 161 of the flywheel 102 and includes two cylindrical or substantially cylindrical layers 162a, 162b the former of which surrounds the latter. The auxiliary mass 162 can constitute an originally cylindrical sheet metal blank which has undergone a suitable deforming treatment, namely a folding of one of its halves over the other half to thus form the layers 162a and 162b. The thus obtained auxiliary mass 162 is slipped onto the annular portion 161 and is reliably secured thereto, e.g., by welding or by deforming certain neighboring parts of the portion 161 and layers 162a, 162b to thus hold the three annular layers of the resulting multiple-layer part against axial and/or angular movement relative to each other. Such operations can be carried out in a suitable sheet metal forming and upsetting machine.

In accordance with a feature of the invention which is embodied in the apparatus 101 of FIG. 3, the radially inner layer 162b of the auxiliary mass 162 is provided with suitably configured, dimensioned and distributed engine management indicia 164 which can be monitored to generate signals serving to ensure proper timing of certain operations of the engine in the power train of a motor vehicle, e.g., to guarantee an optimum timing of fuel ignition and/or an optimum timing of fuel injection into the cylinders of the engine. The indicia 164 can be of one piece with the auxiliary mass 162, or they can be affixed to one of its layers 162a, 162b.

A second multiple-layer auxiliary mass 163 is affixed to the outer side of the radially outer portion of the radial wall 160 of the primary flywheel 102. The mass 163 is a composite washer including two layers 163a, 163b which overlie each other as seen in the axial direction of the primary flywheel 102. This mass can also constitute a converted single-layer washer-like sheet metal blank which has undergone an appropriate deforming treatment. A narrower third layer 163c of the auxiliary mass 163 overlies a portion of the exposed side of the layer 163b. The intermediate layer 163b fully overlaps the two outer layers 163a and 163c. It is clear that the number of layers in the auxiliary mass 162 and/or 163 can be increased or reduced without departing from the spirit of the invention.

The radially outermost portions of the layers 163a, 163b together define a starter gear 113 which is of one piece with the auxiliary mass 163. It is often advisable to subject at least those portions of the layers 163a, 163b which constitute and which are adjacent the starter gear 113 to a suitable hardening treatment. Alternatively, the entire auxiliary mass 162 and/or 163 can be subjected to a suitable hardening treatment, e.g., induction hardening.

The means for connecting the auxiliary mass 163 to the primary flywheel 102 includes the rivets 133 which further serve to affix the radially outer portion of the flange 120 to the radially extending wall 160 of the primary flywheel 102 radially outwardly of the hysteretic damping device 140. However, it is also possible to connect the mass 163 to the flywheel 102 by means other than the rivets 133.

In contrast to the construction of the apparatus 1, that portion (103a) of the secondary flywheel 103 which is provided with the friction surface 109 is not directly centered to the bearing 106 but rather by way of the cheek 123 of the output element 12 of the damper 108.

The separately produced part 156 can be omitted if the radially inner portion of the cheek 123 is provided with a cylindrical portion corresponding to the axial extension 152. Analogously, one can dispense with the separately produced part 117 of FIG. 3 if the radially innermost part 159 of the wall 160 of the primary flywheel 102 is made of one piece with the portion 115 which is surrounded by the cylindrical sleeve 106a of the bearing 106.

FIG. 4 shows a portion of an apparatus which constitutes a slight modification of the apparatus 101 of FIG. 3. The construction of the module 150 and of the clutch 151 is practically identical to that of the similarly referenced parts in the apparatus 101 except that the housing 169 of the clutch 151 shown in FIG. 4 is affixed to the portion 103a of the secondary flywheel 103 in a somewhat different way. Thus, and whereas the heads of the fasteners 111a shown in FIG. 3 are accessible at the periphery of the axially movable pressure plate 166, the heads of the fasteners 165 performing the same function in the apparatus employing the structure of FIG. 4 are accessible at that side of the portion 103a of the secondary flywheel which confronts the primary flywheel (not shown in FIG. 4). As already mentioned hereinbefore, the module 150 of FIG. 4 comprises the portion 103a of the secondary flywheel, the clutch 151, and the clutch disc 168 with friction linings 167 located between the friction surface of the portion 103a and the pressure plate 166. The inner side of the housing 169 in the friction clutch 151 of FIG. 4 tiltably supports the circumferentially complete radially outer portion of a clutch spring 170 (such as a diaphragm spring) which serves to bias the friction linings 167 of the clutch disc 168 against the portion 103a of the secondary flywheel when the clutch 151 is engaged. The clutch 151 is disengaged, either entirely or in part, by pushing the radially inwardly extending prongs of the clutch spring 170 axially in a direction toward the primary flywheel.

In the damping apparatus 101 of FIG. 3, the cheek 123 forms part of the module 150 because the radially outermost portion of this cheek is affixed to the portion 103a of the secondary flywheel 103 by the fasteners 111a with heads accessible at the clutch side of the portion 103a.

The fasteners 165 for the module 150 of FIG. 4 can further serve as a means for centering the clutch housing 169 relative to the portion 103a of the secondary flywheel. To this end, the fasteners 165 preferably constitute so-called dowel screws or close tolerance screws with smooth cylindrical shank portions in addition to the customary externally threaded shank portions. The cylindrical shank portions are preferably adjacent the heads of the fasteners 165 and are a close fit in the complementary holes or bores of the portion 103a.

Alternatively, the fasteners 165 of the type shown in FIG. 4 can be replaced with standard screws; however, it is then advisable to employ one or more suitable dowel pins or other alignment pins (one shown in FIG. 4a, as at 165a) to ensure that the housing 169 is properly centered on the portion 103a of the secondary flywheel.

The pressure plate 166 in the friction clutch 151 of FIG. 3 has suitably configurated recesses, grooves or sockets 166a for the heads of the fasteners 111a. This renders it possible to install such fasteners very close to the common axis of the flywheels 102 and 103, i.e., to render the apparatus 101 more compact as seen in the radial direction of the common axis. The pressure plate 166 in the friction clutch 151 of FIG. 4 has similar recesses 166b which render it possible to install the fasteners 165 immediately radially outwardly of the friction linings 167 of the pressure plate 168.

The torsional vibration damping apparatus 201 of FIG. 5 exhibits certain features of the apparatus 1 of FIGS. 1–2 as well as certain features of the apparatus 101 of FIG. 3. It comprises an antifriction ball or roller bearing 206 which forms part of the centering means 204 and has an inner race surrounding the cylindrical portion of the part 215 carried by the radially innermost portion of the radially extending wall of the primary flywheel 202. The rivets 224 perform the function of rivets 24 in the apparatus 1 and further serve to secure the portion 203a of the secondary flywheel 203 to the output element 221 of the damper operating between the input and output members of the apparatus 201 and including coil springs (one shown but not referenced) or other suitable energy storing devices. The portion 203a of the secondary flywheel 203 is an annular body which is provided with a friction surface 209 for the adjacent friction linings of the clutch disc forming part of or cooperating with the friction clutch 251. The difference between the rivets 224 of the type utilized in the apparatus 201 and the rivets 124 in the apparatus 101 of FIG. 3 is that the rivets 124 merely connect the cheeks 122, 123 of the output element 121 of the damper 108 to each other; on the other hand, the rivet 224 which is shown in FIG. 5 connects the two cheeks of the output element 221 to each other and additionally serves to connect the cheek 223 (i.e., the output element 221) to the portion 203a of the secondary flywheel 203.

The construction of the friction clutch 251 of FIG. 5 is analogous to that of the friction clutch 151 in the apparatus 101 of FIG. 3 except that the housing 269 of the clutch 251 is not directly connected to the cheek 223 of the output element 221 of the damper in the apparatus 201 but rather to a separately produced part 270 which is clamped to the cheek 223. The part 270 includes a radially outermost portion 271 with axially parallel bores or holes for the fasteners 211a (only one shown in FIG. 5), and a radially inwardly extending portion 272 located between the portion 203a of the secondary flywheel 203 and the radially outermost portion 223a of the cheek 223. The rivets 224 urge the portion 223a against the portion 272 so that the latter is clamped between the portion 203a of the flywheel 203 and the cheek 223 of the output element 221 of the damper in the apparatus 201 of FIG. 5. A satisfactory frictional engagement between the portion 272 on the one hand and the portions 223a, 203a on the other hand can be achieved by resorting to an appropriate configuration, dimensioning and mounting of the rivets 224 and/or by making at least the radially outermost portion 223a of the cheek 223 and/or the separately produced part 270 of a suitable elastically deformable material. This ensures that the form-locking connection between the housing 269 of the clutch 251 and the output element 221 of the damper exhibits the required frictional resistance to rotation of its constituents relative to each other. In other words, the just described frictional form-locking connection normally prevents rotation of the part 270 and the flywheel portion 203a relative to each other; however, such connection can yield when the magnitude of the torque to be transmitted from the flywheel portion 203a to the clutch housing 269 exceeds a maximum permissible value.

The clutch spring 273 (such as a diaphragm spring corresponding to the spring 170 in the clutch 151 of FIG. 3) is designed and installed to ensure that the clutch 251 can readily transmit torque having a desired (predetermined) magnitude. When the clutch 251 is engaged, the spring 273 causes the pressure plate 266 to urge the friction linings of the clutch disc (not referenced in FIG. 5) against the friction surface of the flywheel portion 203a and the latter urges the portion 272 of the part 270 against the portion 223a of the cheek 223. In other words, the clutch spring 273 can influence the form-locking connection between the portion 272 on the one hand and the portions 223, 203a on the other hand (at least when the friction clutch 251 is engaged). However, the influence of the bias of the spring 273 upon the aforementioned form-locking connection is greatly reduced (or is nil) when the clutch 251 is disengaged (in that the spring 273 permits the pressure plate 266 to reduce the force with which the friction linings of the clutch disc are urged against the friction surface of the flywheel portion 203a, or the spring 273 even permits the pressure plate 266 to become disengaged from the adjacent friction linings.

It follows from the above that the form-locking connection is stronger when the clutch 251 is engaged than when the clutch is disengaged because the bias of the spring 273 upon the parts 203a, 272 and 223a is much more pronounced when the friction clutch is engaged. FIG. 5 shows the position of the diaphragm spring 273 by solid lines when the friction clutch 251 is engaged, and by dotted lines when the clutch is disengaged.

The force-locking connection between the parts 223a, 272, 203a can be selected in such a way that it can respond to fluctuations of torque when the clutch 251 is disengaged and that it can also respond to fluctuations of torque exceeding, for example, the nominal engine torque; at such times, the friction clutch 251 and the part 270 (which is affixed to the clutch 251) can slip relative to the portion 203a of the secondary flywheel 203.

FIG. 6 illustrates a modified design of the means for centering the primary and secondary flywheels relative to each other. The centering means 304 of FIG. 6 comprises an antifriction ball bearing 306 having an inner race which surrounds the axially extending cylindrical portion 315 of a separately produced part (corresponding to the part 17 in the apparatus 1 of FIGS. 1–2) which is affixed to the innermost portion of the radial wall of the primary flywheel by fasteners 319. The outer race 306b of the bearing 306 is surrounded by an axially extending cylindrical portion 352 forming part of a discrete constituent 356 having an L-shaped cross-sectional outline. The radially extending portion or part 355 of the constituent 356 is affixed to the cheek 323 of the output element of the damper in the apparatus including the structure of FIG. 6 in a manner as already described with reference to the apparatus 101 of FIG. 3, namely by rivets 358. However, such riveted connection can be replaced by or used jointly with other suitable connection or connections; for example, the portion 355 can be welded to the cheek 323.

It will be noted that the radially extending portion 355 of the separately produced constituent 356 is adjacent that side of the cheek 323 which confronts the fasteners 319. The radially innermost part of the cheek 323 includes projections 323a in the form of lugs extending radially inwardly beyond the constituent 356 and serving as a means for centering the outer race 306b of the bearing 306. In other words, the projections 323a serve to center the secondary flywheel (which is connected to the output element including the cheek 323) relative to the primary flywheel carrying the portion 315. Radial centering of the secondary flywheel is effected by the cylindrical portion 352.

The torsional vibration damping apparatus 401 including the structure shown in FIG. 7 comprises coaxial primary and secondary flywheels 402, 403 adapted to rotate relative to each other against the opposition of a damper and about a common axis determined by a centering means including a journal bearing 406 of a type similar to that shown (at 106) in the apparatus 101 of FIG. 3.

The primary flywheel 402 forms part of or constitutes the input member of the apparatus and includes a radially extending wall 459 having a radially innermost portion 460 separably secured to the output component of a prime mover by axially parallel threaded fasteners 419. The radially outermost portion of the wall 460 is of one piece with an annular portion 461, and the junction between the parts 460, 461 of the primary flywheel 402 carries a starter gear 413 which is welded, soldered or otherwise affixed thereto.

The parts 460, 461 are preferably made of a suitable metallic sheet material, and the radially outer portion of the wall 460 carries two auxiliary masses or auxiliary flywheels 462, 463. The mass 463 is located at the outer side of the wall 460 (i.e., it confronts the prime mover when the apparatus 401 is in use), and the mass 462 is located opposite the mass 463, i.e., it confronts the secondary flywheel 403. Rivets 433 are utilized to securely affix the auxiliary masses 462, 463 to the wall 460 of the primary flywheel 402. The basic constituent (460-461) as well as the auxiliary masses 462, 463 of the primary flywheel 402 can be made of a suitable metallic sheet material by resorting to blanks which can be folded and/or otherwise deformed in available machinery and at a reasonable cost. At least those blanks which are converted into the auxiliary masses 462, 463 can constitute suitably configurated flat pieces of metallic sheet material.

The mass 462 has a substantially L-shaped cross-sectional outline with a twin-layer radially inwardly extending leg 462a and an annular outer leg 462b adapted to carry the aforediscussed engine management (and/or other) indicia (shown at 464). The illustrated leg 462b consists of a single layer of metallic sheet material and is surrounded by the annular portion 461.

The input element or flange 420 of the damper 408 is adjacent the inner side of the wall 460 and is affixed to the latter as well as to the layers of the leg 462a by the aforementioned rivets 433. Due to the just described mode of utilizing the rivets 433 to connect the flange 420 to the legs 462a and to the wall 460, there is established between the parts 460, 420 and radially inwardly of the layer 462 an annular space which receives the hysteretic damping device 440 in such a way that the latter does not or need not appreciably contribute to the dimensions of the apparatus 401 as seen in the direction of the common axis of the flywheels 402 and 403. The device 440 can be similar to or identical with the device 40 in the apparatus 1 of FIGS. 1–2 or with the device 140 in the apparatus 101 of FIG. 3.

The friction clutch 451 is affixed to the cheek 423 and to the secondary flywheel 403 in a manner as described with reference to FIG. 3 and is located radially inwardly of the annular leg 462b of the auxiliary mass 462, i.e., radially inwardly of the annular portion 461 of the main section 460, 461 of the primary flywheel 402.

It will be noted that the axial sectional views shown in FIGS. 3 to 7 are angularly offset relative to each other. The same holds true for at least some of the sectional views shown in FIGS. 8 through 17. The reason is that such selection of the sectional views ensures adequate or best possible illustration of various features which distinguish the illustrated embodiments from each other. Reference may be had, for example, to the sectional views of the cheeks 123, 223, 323, 423, of the portions 155, 255, 355, 455 as well as of certain other parts in the illustrated and already described embodiments. The clutch disc is also shown in different sectional views (compare the discs 168 and 568 of FIGS. 3 and 8). For example, different axial sectional views are deemed to be necessary (i.e., axial sectional views which are offset relative to each other) in order to ensure that the Figures show the openings provided in the clutch disc (note the non-referenced opening in the clutch disc 168 of FIGS. 3 and 4) and/or in the clutch spring (such as 170 or 273) in order to afford access to the fasteners (such as 19, 319, 419, etc.) by resorting to standard tools and/or to specially designed tools. In this connection, reference may be had to published German patent applications Serial Nos. 41 17 579, 41 17 582 and 41 17 571 the disclosures of which are incorporated herein by reference.

The torsional vibrations damping apparatus 501 of FIG. 8 comprises a damper 508 which is, or which can be, at least substantially identical with the damper 8 in the apparatus 1 of FIGS. 1 and 2. Furthermore, the centering means 504 (including the bearing 506) between the primary and secondary flywheels 502, 503 of the apparatus 501 is identical with or at least very similar to the centering means 4 of the apparatus 1. Rivets 533 are provided to non-rotatably connect the primary flywheel 502 with the input element (flange) 520 of the damper 508, and rivets 524 are employed to establish a non-rotatable connection between the cheeks (including the cheek 523) of the output element of the damper 508 and the secondary flywheel 503. The primary flywheel 502 is a converted blank of sheet metal (in contrast to the primary flywheel 2 which is a casting or a forging and is normally subjected to at least some material removing secondary treatment upon completion of the casting or forging operation).

The portion 503*a* of the secondary flywheel 503 (this portion constitutes the main portion or part of the flywheel 503) has a radially innermost portion which surrounds and carries the outer race of the bearing 506; the latter constitutes an antifriction bearing with an annulus of spherical or other suitable rolling elements. The inner race of the bearing 506 surrounds a cylindrical sleeve of the annular portion 515 which is affixed to the primary flywheel 502, at least when the flywheel 502 is properly affixed to the output component of the prime mover.

The radially extending wall 560 of the primary flywheel 502 carries an auxiliary mass 562 which is secured thereto by axially parallel rivets 533; these rivets further serve to connect the wall 560 with the flange 520 and to thus provide room for the hysteretic damping device (not referenced) radially inwardly of the radially extending twin-layer leg 562*a* of the auxiliary mass 562. The annular portion 562*b* of the mass 562 also comprises two layers, and this mass is also assumed to constitute a converted blank of metallic sheet material or any other suitable sheet material (preferably a suitably deformed originally round blank). The outer layer of the annular portion 562*b* is surrounded and can be contacted by the annular portion 561 which is of one piece with the wall 560 and carries a (non-referenced) starter gear. The wall 560 and the annular portion 561 constitute the two constituents of the main part 559 of the primary flywheel 502. The annular portion 561 can be utilized as a means for centering the auxiliary mass 562 relative to the main part 559.

It is often preferred to design and to select the dimensions of the annular portion 561 in such a way that its stability exceeds that of the annular portion 562*b* of the auxiliary mass 562. This is particularly desirable when the portion 562*b* exhibits a tendency to undergo deformation under the action of centrifugal force.

The friction clutch 551 which is mounted on the secondary flywheel 503 is a so-called self-adjusting clutch which is designed to automatically compensate for wear on those parts which are most likely or particularly likely to undergo at least some wear in response to repeated engagement and disengagement of the clutch, especially when the clutch is operated with slip which entails pronounced wear upon the friction linings 567 of the clutch disc 568. The friction linings 567 are located between the annular friction surface of the portion 503*a* of the secondary flywheel 503 and the axially movable pressure plate of the clutch 551. The latter further comprises a suitable housing 569 which is rotated by the secondary flywheel 503, and a clutch spring 573 (e.g., a diaphragm spring which is tiltable relative to the housing 569 and is automatically shifted toward the friction linings 567 at necessary intervals in order to compensate for wear, at least upon the friction linings). An important advantage of a self-adjusting clutch is that the force which is required to disengage the clutch is at least substantially constant during the entire useful life of the clutch.

Self-adjusting clutches which can be utilized in the apparatus 501 of FIG. 8 are disclosed, for example, in commonly owned U.S. Pat. No. 5,450,934 granted Sep. 19, 1995 to Paul Maucher for "FRICTION CLUTCH". Reference may also be had to published German patent applications Serial Nos. 42 39 291, 43 06 505, 42 39 289 and 43 22 677.

The manner in which the friction clutch 551 is attached to the portion 503*a* of the secondary flywheel 503 is analogous to that described in connection with the clutch 251 and portion 203*a* of the secondary flywheel 203 shown in FIG. 5. Thus, the force-locking connection is designed in such a way that the friction clutch 551 can slip relative to the portion 503*a* of the secondary flywheel 503 at least when the clutch is disengaged (so that the bias of the clutch spring 573 upon the portion 503*a* and the radially outermost portion 523*a* of the cheek 523 is less pronounced) and while the magnitude of transmitted torque undergoes abrupt and pronounced changes.

The just described force-locking connection between the friction clutch 551 and the portion 503*a* the secondary flywheel 503 can be said to constitute a torque limiting device (identified by reference character 574) which includes an annular diaphragm-like resilient element 570 acting not unlike a diaphragm spring. When not installed in the apparatus 501, the resilient element 570 assumes a frustoconical shape similar to that of an unstressed diaphragm spring. The imaginary apex of the cone is located to the left of the resilient element 570 (as viewed in FIG. 8), i.e., the cone tapers toward the radial wall 560 of the primary flywheel 502. The element 570 is stressed and deformed to assume the shape which is shown in FIG. 8 in response to the application of the rivets 524, i.e., in response to attachment of the output element (including the cheek 523) to the portion 503*a* of the secondary flywheel 503. When properly installed, the resilient element reacts against the radially outer part of the portion 503*a* and bears against the radially outer portion 523*a* of the cheek 523. The location (annular surface) where an intermediate portion of the resilient element 570 reacts against the portion 503*a* of the secondary flywheel 503 is shown at 503*b*. The radially outermost portion of the resilient element 570 is affixed to the housing 569 of the friction clutch 551 by screws or the like.

The bias of the properly installed resilient element 570 is or can be selected in such a way that the properly stressed element 570 generates an axial force force greater than the maximum disengaging force which is being applied during the useful life of the friction clutch 551. This ensures that the clutch housing 569 cannot be shifted in the axial direction of the flywheels 502, 503 under the bias of the resilient element 570. The slip torque of the torque limiting device 574 including the resilient element 570 can be reduced if the axial force furnished by the resilient element 570 equals or rather closely approximates the maximum disengaging force which is required to operate the friction clutch 551.

The part 270 in the apparatus 201 of FIG. 5 can also constitute or resemble a frustoconical diaphragm spring which is deformed (flattened) when properly mounted in the apparatus 201.

The apparatus 601 of FIG. 9 comprises coaxial primary and secondary flywheels 602, 603 which are centered relative to each other by a device 604 including an antifriction bearing similar to or identical with the bearing 6 of FIG. 2 or the bearing 506 of FIG. 8. The primary flywheel 502 comprises a main part 659 including a radially extending wall and an annular radially outer portion 661. The main part 659 is a converted originally flat blank having a rather pronounced thickness (e.g., in the range of 4–7 mm) and preferably consists of a suitable metallic sheet material. The outer portion 661 has two closely adjacent annular layers 661a, 661b which can or do actually contact each other. However, it is equally possible to design the outer portion 661 in such a way that its layers 661a, 661b are at least partially spaced apart from each other as seen in the radial direction of the flywheel 602; for example, such layers can define an annular space having a predetermined width as measured radially of the common axis of the flywheels 602 and 603. It has been found that the just described annular portion 661 can contribute significantly to the inertia of the main part 559 and of the entire primary flywheel 602.

The main part 659 of the flywheel 602 carries an auxiliary mass 663 having a substantially L-shaped cross-sectional outline. The mass 663 has a twin-layer annular radially outermost portion 663b which surrounds and extends axially beyond the annular portion 661 of the main part 659. The radially extending portion 663a is outwardly adjacent the radially outer portion of the radial wall of the main part 659 and is secured to the radial wall by a set of rivets 633 (only one can be seen in FIG. 9). The annular portion 661 can serve as a means for centering the auxiliary mass 663 on the main part 659. The illustrated mass 663 also constitutes a converted (originally plane) blank of a suitable metallic sheet material and is configurated in such a way that only its annular portion 663b comprises several (two) layers. It is clear that, if desired or necessary (namely to further increase the inertia of the primary flywheel 602), the radial portion 663a of the auxiliary mass 663 can comprise two or more layers and/or the annular portion 663b can comprise more than two layers.

The starter gear 613 is installed in a seat 663c at the junction of the portions or legs 663a, 663b of the auxiliary mass 663.

The rivets 633 serve to secure the auxiliary mass 663 to the main part 659 of the primary flywheel 602 as well as to connect the primary flywheel with the cheeks 622, 623 of the input element 620 of the damper 608 including the energy storing devices 607 (only one shown in FIG. 9). It will be noted that, in the apparatus 601, the cheeks 622, 623 form part of the input element 620 and the flange 621 forms part of or constitutes the output element of the damper 608. The flange 621 forms part of a frictional connection 674 which serves to normally transmit torque from the cheeks 622, 623 (via energy storing devices 607) to the secondary flywheel 603 of the apparatus 601.

The cheek 623 is provided with several pockets or recesses 624 which are spaced apart from each other in the circumferential direction of the flywheels 602, 603. The recesses or pockets 624 extend axially away from a front surface 624a which abuts the cheek 622. The rivets 633 are adjacent the pockets 624, and such pockets can be said to constitute distancing elements which maintain the cheeks 622, 623 at a desired axial distance from each other. The pockets 624 extend through cutouts or windows 635 which are provided in the flange 621 of the damper 608; this enables the pockets to contact the cheek 622 since the cheeks 622, 623 are installed at opposite sides of the flange 621 (output element) of the damper 608. The pockets or recesses 624 serve to cause the energy storing devices 607 to store energy (or to store additional energy) when the flywheels 602, 603 and the input and output elements of the damper 608 are caused to turn relative to each other. The cutouts or windows 635 further serve as a means for limiting the extent of angular displacement of the flywheels 602, 603 relative to each other, i.e., each pocket 624 can move from abutment with the surface at one end to abutment with the surface at the other end of the respective window 635 (as seen in the circumferential direction of the flywheels 602 and 603). Thus, the means for limiting the extent of angular displacements of the flywheels 602, 603 relative to each other is clearly analogous to the corresponding means 24 and 35 in the apparatus 1 of FIGS. 1 and 2.

The cheeks 622, 623 and the flange 621 are provided with at least partially overlapping cutouts for portions of the energy storing devices 607; the surfaces bounding such cutouts ensure that the devices 607 store additional energy or dissipate at least some energy when the cheeks 622, 623 are caused to turn relative to the flange 621 and/or vice versa.

The apparatus 601 further comprises a torque limiting device 674 which operates between the flange (output element) 621 of the damper 608 and the secondary flywheel 603. Furthermore, the device 674 serves to limit the magnitude of the torque which can be transmitted from the flange 621 to a friction clutch if such clutch is mounted on the secondary flywheel 603. The illustrated torque limiting device 674 is a multistage (in the apparatus 601 a two-stage) slip clutch. The two stages 674a and 674b are set up to operate in parallel with each other and the stage 674b is installed radially outwardly of the stage 674a.

The stage 674a comprises an energy storing element 675 which constitutes a diaphragm spring and has a radially outermost portion abutting a cupped member 676 mounted on the secondary flywheel 603 in such a way that it cannot move relative to the flywheel 603 in the direction of the common axis of the two flywheels. Alternatively, the cupped member 676 can be affixed to the housing of a friction clutch while such clutch is being assembled with the secondary flywheel 603. It is desirable to ensure that the diaphragm spring 675 is held against rotation relative to the member 676; this is achieved by providing the radially outermost portion of the element 675 with teeth 677 mating with complementary teeth on the adjacent portion of the cupped member 676. In other words, the first stage 674a comprises a form-locking connection 677 between the parts 675 and 676.

The energy storing element 675 bears upon the radially outermost portion 621a of the flange (output element) 621 of the damper 608 so that the flange 621 is frictionally held between the secondary flywheel 603 and the energy storing element 675. The just described parts 603, 621, 675 of the first stage 674a can directly abut each other; however, it is equally possible (and often desirable) to insert a friction lining or another friction generating device between at least two of these parts or to coat at least one side of at least one of the parts 603, 621, 675 with a layer of suitable friction generating material. For example, it is often advisable to phosphatize that side of the energy storing element 675 which abuts the flange 621, to phosphatize that side of the flange 621 which abuts the element 675 and/or to phosphatize that side of the flange 621 which abuts the flywheel 603 and/or to phosphatize that side of the flywheel 603 which abuts the flange 621.

The radially outer second stage 674b of the torque limiting device 674 also comprises an energy storing element 678 (such as a diaphragm spring) which is stressed axially of the flywheels 602, 603 between the portion 676a of the cupped member 676 and the portion 603a of the secondary flywheel. A friction generating lining is provided at each side of the energy storing element 678, i.e., adjacent the portion 676a of the cupped member 676 and adjacent the portion 603a of the secondary flywheel 603. However, such friction generating means are optional at least under certain circumstances; furthermore, they can be replaced by other types of friction generating means, such as a suitable friction generating coating on at least one of each pair of abutting surfaces in the stage 674b. Phosphatizing or the application of hard nickel coatings are but two of presently favored undertakings to ensure a desirable frictional engagement between the constituents of the stage 674b.

A driving or motion transmitting connection 679 is provided between the stages 674a and 674b. The illustrated driving connection comprises mating gears including first teeth at the radially inner portion of the energy storing element 678 and second teeth at the radially outer portion of the flange 621. The two sets of teeth mesh with a certain amount of play in such a way that the radially inner stage 674a can act alone while the flywheels 602, 603 turn relative to each other through a selected angle. This selected angle is preferably not less than 10° but can also greatly exceed 10° (for example, it can equal or approximate or even exceed 20°). However, it is also possible (and under certain circumstances desirable and advantageous) to select an angle which is less than 10°.

FIG. 9 shows the cupped member 676 in that axial position in which the elements (such as diaphragm springs) 675 and 678 are caused to store desired or selected amounts of energy.

The cupped member 676 can be installed in the apparatus 601 during attachment of a friction clutch (not shown in FIG. 9) to the secondary flywheel 603, and such operation involves attachment of the member 676 to the housing of the friction clutch. To this end, the member 676 can be designed and installed in such a way that it is movable in the axial direction of the flywheels 602, 603 prior to attachment of a friction clutch to the flywheel 603, i.e., such mounting of the friction clutch on the flywheel 603 automatically results in requisite axial positioning of the member 676. The energy storing elements 675 and 678 are free to move the member 676 in a direction to the left of the position shown in FIG. 9 before the clutch is affixed to the secondary flywheel 603; such shifting of the member 676 to the left of the position which is shown in FIG. 9 is possible because the energy storing elements 675 and 678 store little or no energy prior to mounting of the friction clutch on the flywheel 603 but are caused to store energy by undergoing at least some stressing in the axial direction of the flywheels during attachment of the friction clutch. The unstressed energy storing elements 675 and 678 (which are assumed to constitute diaphragm springs) exhibit a conicity which is much more pronounced when they are permitted to dissipate stored energy or prior to undergoing axial stressing, such as in response to attachment of a friction clutch to the secondary flywheel 603. The imaginary apices of such conical energy storing elements 675, 678 are located to the right of their radially outermost portions, as viewed in FIG. 9. Such design and mounting of the elements 675, 678 ensure that, once the friction clutch is detached from the secondary flywheel 603, the latter can be turned relative to the primary flywheel 602 without any resistance or with a minimum of resistance. Such angular displacement of the secondary flywheel 603 renders it possible to place its opening 649 into requisite positions of axial alignment with the fasteners 619, e.g., for the purpose of ensuring that the heads of the fasteners 619 can be reached and properly engaged by the working end of a suitable tool (not shown). This greatly simplifies the task of replacing a damaged apparatus 601 with a new one or of temporarily detaching the apparatus 601 from the output component of a prime mover for the purpose of inspection and/or maintenance and/or repair work.

The slip torque of at least one of the stages 674a, 674b of the multistage torque limiting device 674 can be less than the nominal torque of the prime mover serving to rotate the primary flywheel 602. Nevertheless, the sum of torques which can be transmitted by the two stages can ensure a slip-free transmission of torque which is being supplied by the output component of the prime mover.

The aforediscussed convenient turning of the secondary flywheel 603 relative to the primary flywheel 602, particularly to gain access to the heads of the fasteners 619 by way of the openings 649, is especially important and desirable when the construction of the apparatus 601 is such that the heads of the fasteners 619 can be reached only from one axial end of the apparatus, such as in a direction from the right to the left as viewed in FIG. 9.

The damper 608 of the apparatus 601 can also comprise five equidistant energy storing devices 607, such as coil springs. In addition to the previously discussed advantages of a damper employing five energy storing devices, such damper exhibits the advantage that the relatively small number of devices 607 can be installed close to the common axis of the flywheels 602, 603, i.e., close to the centering means 604. This renders it possible to reduce the diameter of the apparatus 601. It is presently preferred to install the centering means 604 radialy inwardly of the annulus of (preferably five) energy storing devices 607.

The apparatus 701 of FIG. 10 comprises an input member including a primary flywheel 702, an output member including a secondary flywheel 703, a damper 708 which opposes angular movements of the flywheels 702, 703 relative to each other and includes energy storing devices 707 in the form of coil springs, and a centering unit 704 including a bearing 706 corresponding to or identical with the bearing 106 of FIG. 3 or the bearing 406 of FIG. 7. The bearing 706 can be replaced with an antifriction roller bearing corresponding to the bearing of the centering means 604 shown in FIG. 9, or the centering means 604 can utilize a bearing corresponding to the bearing 706.

The bearing 706 comprises a first sleeve 706a and a second sleeve 706b which surrounds the sleeve 706a (these parts correspond to the components 106a, 106b of the bearing 106 in the apparatus 101 of FIG. 3). The sleeve 706 surrounds the axial extension 715 of the primary flywheel 702. For example, the sleeve 706a can be a press fit on the extension 715 or it can be fixedly secured to the extension 715 in any other suitable way (e.g., by resorting to one or more threaded or other suitable fasteners). For example, the free end of the portion 715a can be calked or upset in a manner to ensure that the sleeve 706a is reliably maintained in a desired position. It is also possible to employ a prefabricated unit including the sleeves 706a, 706b, with the sleeve 706a already fitted into the sleeve 706b at the bearing manufacturing plant. The just outlined procedure is desirable in many instances because, if the sleeves 706a, 706b are properly assembled at the bearing manufacturing plant, the axially extending part 715a of the portion 715 need not undergo a high-precision treatment such as grinding, turning or the like. It then suffices to produce or shape the portion 715a in a deep drawing machine and to subject (if necessary) the deep drawn part to a calibrating treatment.

The construction of the damper 708 (which operates between the flywheels 702 and 703) is analogous to that of the damper 108 of FIG. 3 or the damper which is shown in FIG. 5. A difference is that the radially outer portions of the cheeks 722, 723 are cupped radially outwardly of the energy storing devices 707 and abut each other, either entirely or in part. The abutting portions 722a, 723a of the cheeks 722 and 723 are affixed to the secondary flywheel 703 by rivets 724. The cheek 722 is provided with recesses or pockets 722b which are adjacent the rivets 724 and extend axially of the apparatus 701 through openings 720a which are provided in the input element (flange) 720 of the damper 708. The output element 721 of the damper 708 includes the cheeks 722 and 723. The dimensions of the opening 720a and of the pockets 722b are selected in such a way that they permit the input and output elements 720, 721 of the damper 708 to perform the required angular movements relative to each other. Reference may be had to the description of cooperation between the rivets 24 and the corresponding openings 35 in the apparatus 1 of FIGS. 1 and 2.

The configuration of the main part 759 of the primary flywheel 702 is analogous to that of the primary part 659 of the primary flywheel 602 in the apparatus 601 of FIG. 9. The configuration of the annular portion 761 is somewhat different from that of the annular portion 661 because the auxiliary mass 762 of the primary flywheel 702 is disposed in part within the annular portion 761. The axially extending annular portion 762a of the auxiliary mass 762 projects beyond the annular portion 761 and carries a starter gear 713. Such starter gear can be utilized jointly with or can be replaced by suitable engine management indicia 713a. Such indicia can form a separate ring which is utilized jointly with or in lieu of the starter gear 713.

A hysteretic damping device 740 is installed to operate between the flywheels 702, 703, for example, in the same way as already described for the devices 40, 140 and 440.

An energy storing resilient element 775 (shown in the form of a diaphragm spring) is installed between the flange 720 and the cheek 722 to establish a permanent basic friction or hysteresis that is effective during each stage of angular movement of the input and output elements 720 and 721 of the damper 708 relative to each other. The resilient element 775 is installed in such a way that it is stressed in the direction of the common axis of the flywheels 702 and 703. Since the secondary flywheel 703 has some freedom of axial movement, it can be acted upon by the energy storing diaphragm spring 775 to move toward the primary flywheel 702. The arrangement can be such that the flywheel 702 is biased or pulled toward the flywheel 702. The bias of the spring 775 is taken up by the radially outwardly extending collar 706b of the bearing 706. The spring 775 can be installed at another location, as long as it operates between two parts which can turn relative to each other. Furthermore, this spring can be utilized jointly with one or more additional springs to jointly generate and maintain a basic friction or hysteresis during each stage of angular movement of the input and output elements of the damper 708 relative to each other.

FIG. 11 illustrates another centering unit 804 which employs a journal bearing (namely a bearing without spherical and/or other rolling elements between two races) adapted to be utilized in the apparatus 701 of FIG. 10 as well as in other embodiments of the improved apparatus. The bearing 806 is installed radially inwardly of the annular portion 815 (the latter forms part of or is affixed to the primary flywheel 802). The sleeve 852 of FIG. 11 is carried by the secondary flywheel and is surrounded by the bearing 806.

The apparatus 901 of FIG. 12 comprises a primary flywheel 902, a secondary flywheel 903, and a centering device 904 which is analogous to or identical with the centering device 4 of FIGS. 1–2, the device 304 of FIG. 6 or the device 504 of FIG. 8 or the device 604 of FIG. 9. The damper 908 and the torque limiting device 974 of the apparatus 901 are or can be identical with the units 608 and 674 in the apparatus 601 of FIG. 9. A difference between the cheek 922 of input element of the damper 908 and the cheek 622 of the apparatus 601 is that the cheek 922 comprises radially inwardly extending portions 922a which can be clamped between the heads 919a of the fasteners 919 and the radially inner portion of the radial wall 962 forming part of the primary flywheel 902. The wall 962 is made of a suitable metallic sheet material.

That portion of the cheek 922 which extends radially outwardly beyond the energy storing devices 906 of the damper 908 is affixed to the wall 962 by rivets 933. Thus, the cheek 922 is fixedly secured to the wall 962 radially inwardly of the energy storing devices 906 (as at 919a, 922a) as well as radially outwardly of the devices 906 (by the rivets 933). The intermediate portion of the cheek 922 (between the rivets 933 and the heads 919a, as seen radially of the common axis of the flywheels 902, 903) is spaced apart from the wall 962 so that the parts 922, 962 together form a box-shaped annular body which greatly enhances the stability of the corresponding part of the primary flywheel 902 and of the entire apparatus 901 (as seen in the axial direction of the flywheels). Consequently, the axial stability or rigidity of the apparatus is quite acceptable even if the main part (including the wall 962) of the primary flywheel 902 is made of a relatively thin sheet material. The stability of the damper 908 and of the entire apparatus 901 can be further enhanced by providing the cheek 922 and/or 923 with suitably configured and dimensioned pockets (such as those in the cheek 123 of FIG. 3) for portions of the energy storing devices 906.

The construction of the improved apparatus can be further simplified (with attendant reduction of its dimensions as seen in the axial and/or radial direction of the primary and secondary flywheels) by omitting one or more parts. For example, one of the two cheeks forming part of the input or output element of the damper can be omitted if the primary or the secondary flywheel is provided with means (such as pockets) for reception, retention and stressing of the energy storing devices of the damper. The means for receiving, retaining and stressing the energy storing devices of the damper can be provided directly in one of the flywheels or in a relatively simple part which is affixed to the flywheel.

With specific reference to the apparatus 901 of FIG. 12, the cheek 922 can be omitted if the wall 962 of the primary flywheel 902 is provided with suitable pockets for portions of the energy storing devices 906. Such pockets can resemble the pockets 139 in the cheek 123 of the damper 108 shown in FIG. 3. The pockets in the wall 962 can be formed during conversion of a sheet metal blank into the corresponding (main) part of the primary flywheel 902.

Figure 14:
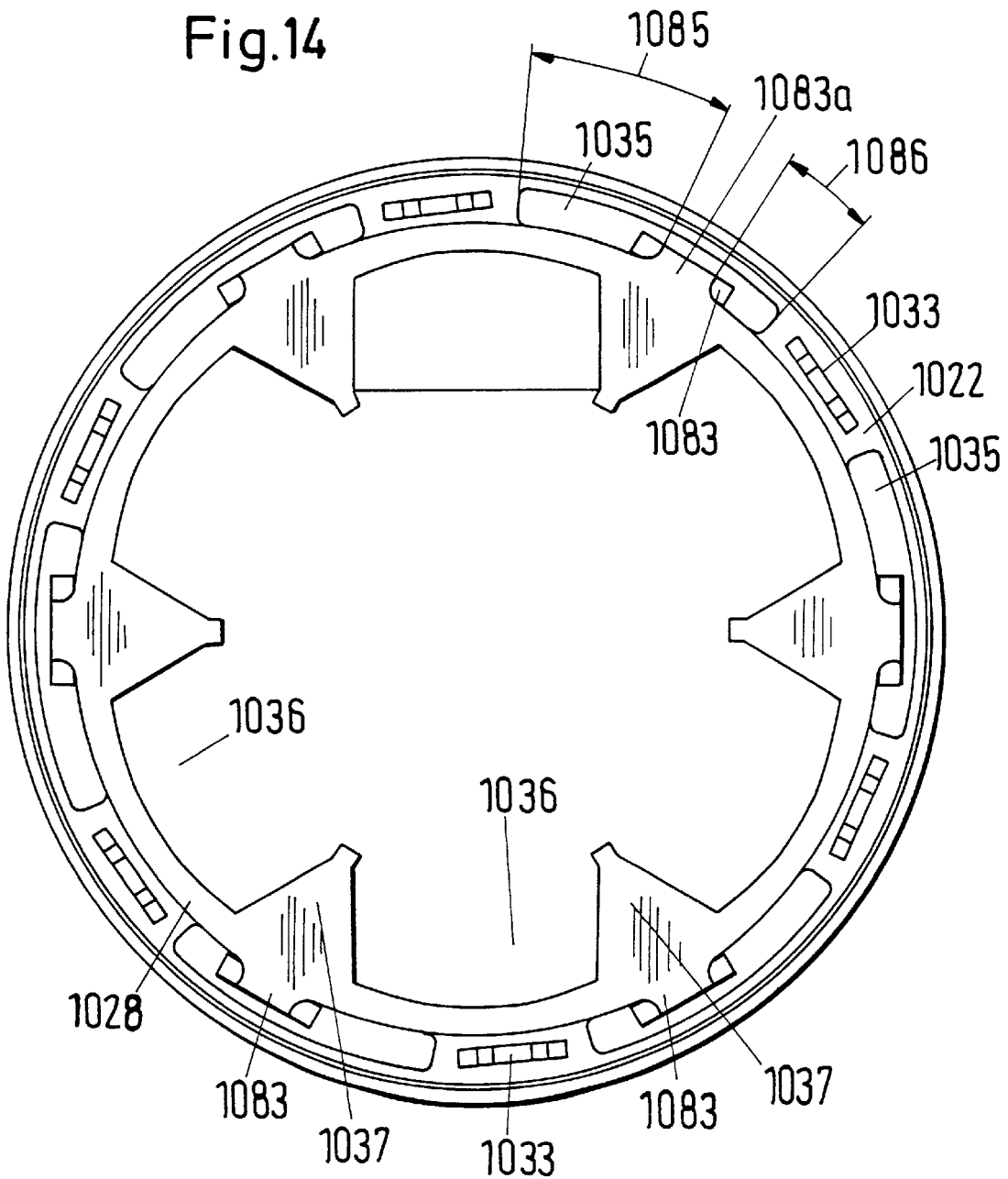
FIG. 14 is a smaller-scale end elevational view of certain constituents of the apparatus which is shown in FIG. 13.

FIGS. 13 and 14 illustrate certain features of a further torsional vibration damping apparatus 1001 which comprises a primary flywheel 1002 and a coaxial secondary flywheel 1003. The main part 1059 of the primary flywheel 1002 is made of a metallic sheet material having a radially outer portion which carries a starter gear 1013. Such radially outer portion of the main part 1059 further supports an auxiliary mass 1062 which is secured thereto by rivets 1033. These rivets are of one piece with the radially extending wall of the main part 1059. The radially innermost portion of the radial wall of the main part 1059 is affixed to the rotary output component (not shown) of a prime mover by the externally threaded shanks of axially parallel fasteners 1019.

The construction of the centering means 1004 (including the journal bearing 1006) for the two flywheels is or can be identical to that of the centering means 104 or 704. An annular member 1080 is installed between the radially innermost portion 1059a of the radial wall of the main part 1059 of the primary flywheel 1002 and the heads 1019a of the fasteners 1019 to serve as a washer for the heads 1019a. This part 1080 extends radially inwardly beyond the fasteners 1019 and provides an annular support 1080a constituting an abutment (as seen axially of the flywheels 1002, 1003) for the radially outwardly extending portion or collar 1006b of the bearing 1006. Furthermore, the radially innermost portion or part of the annular member 1080 further abuts an internal annular shoulder 1015a of the portion 1015 which is affixed to the portion 1059a of the primary flywheel 1002 by the fasteners 1019 and is surrounded by the axially extending sleeve-like part of the bearing 1006. The shoulder 1015a can be omitted if the annular member 1080 is sufficiently stiff to ensure that its radially innermost portion 1080a can constitute a proper axial abutment for the collar 1006b without being propped by the annular portion 1015.

The annular member is practically flat in the regions of the heads 1019a of the fasteners 1019 and is provided with cutouts adjacent the heads 1019a. FIG. 13 shows that innermost portion 1080a is axially offset relative to the radially outer portion of the annular member 1080 so that the radially outer portion can abut the inner side of the portion 1059a.

The part 1056 (corresponding to the part 156 in the apparatus 101 of FIG. 3) is affixed to the cheek 1023, e.g., in the same way as described with reference to the parts 123, 156 in the apparatus 101 of FIG. 3. This part 1056 is provided with openings 1082 which register with openings 1081 provided in the cheek 1023 and serving to afford access to the heads 1019a by the working end of a suitable tool, not shown. As already discussed hereinbefore, the fasteners 1019 can be dimensioned, configured and installed in the portion 1059a in such a way that they cannot be lost or misplaced but are ready for attachment of the flywheel 1002 to the output component of a prime mover as soon as the module shown in FIG. 13 reaches the automobile assembly plant.

If the module further includes a friction clutch 1051 and a clutch disc 1068 (see FIG. 13), the clutch disc 1068 is also provided with openings (one shown but not referenced in FIG. 13) which afford access to the openings 1082. The slots between and/or the configuration of the radially inwardly extending prongs 1073a of the diaphragm spring 1073 forming part of the clutch 1051 are also configured in a manner to ensure that the working end of a tool can be advanced toward and into engagement with the heads 1019a of the fasteners 1019.

The output element 1021 of the damper 1008 comprises two cheeks 1022, 1023 which extend radially of the common axis of the flywheels 1002, 1003 and are axially spaced apart from each other to provide room for the flange 1020 forming part of or constituting the input element of the damper 1008. The flange 1020 has radially inwardly extending arms 1037 which serve to stress the energy storing devices 1007 when the flywheels 1002, 1003 are caused to turn relative to each other.

The cheeks 1022, 1023 are non-rotatably connected to each other by so-called pan head rivets 1033; this reduces the space requirements of the damper 1008 in the radial direction of the apparatus 1001. Furthermore, the cheeks 1022, 1023 are respectively provided with pockets or recesses 1038, 1039 for portions of the energy storing devices 1007. Each pocket 1036 is disposed between two neighboring arms 1037 of the flange 1020 (see FIG. 14) and is open radially inwardly toward the common axis of the two flywheels. The radially outer portion of the flange 1020 has outwardly bent axially parallel projections or arms 1083 which are affixed to the main part 1059 of the primary flywheel 1002. The connections between the main part 1059 and the arms 1083 can be established by providing the free ends of such arms with rivet heads 1084 which are anchored in the radially extending wall of the main part 1059. The manner in which the rivet heads 1084 can be anchored in the main part 1059 is shown in FIG. 13a.

The distribution and certain other features of the arms 1083 forming part of the flange 1020 are also shown in FIG. 14. Thus, the arms 1083 extend through elongated cutouts 1035 of the cheek 1022. When the energy storing devices 1007 of the damper 1008 are not stressed, the portions 1083a of the arms 1083 and the surfaces bounding the cutouts 1035 of the cheek 1022 establish circumferentially extending clearances 1085 as seen in a clockwise direction and clearances 1086 as seen in a counterclockwise direction. The larger clearances are effective when the motor vehicle is called upon to pull a load, and the shorter clearances 1086 are effective when the motor vehicle is coasting.

FIG. 14 further shows that the sets of rivets 1033 and 1083 alternate in the circumferential direction of the apparatus 1001. In other words, each rivet 1033 is located between two rivets 1083 and vice versa.

The torque limiting unit 1074 operates between the cheeks 1022, 1023 of the output element 1021 of the damper 1008 and the portion 1003a of the secondary flywheel 1003. The unit 1074 comprises a radially inner part 1003b of the portion 1003a; the part 1003b extends radially inwardly between the radially outermost portions of the cheeks 1022, 1023 and is located radially outwardly of the rivets 1033. The portion 1003a has an annular friction surface 1009 which is located radially outwardly of the rivets 1033 and surrounds a surface 1087 provided on the part 1003b. The surface 1087 is axially offset relative to the friction surface 1009, preferably through a distance corresponding to the thickness of the radially outermost portion 1023a of the cheek 1023. The axial offset 1088 of the portion 1003a in the region of the radially innermost part of the friction surface 1009 defines an internal circular surface 1089. As can be seen in FIG. 13, the dimensions of the axial offset 1088 and of the radially outermost portion 1023a of the cheek 1023 are related to each other in such a way that the secondary flywheel 1003 is guided radially of the apparatus 1001 by the radially outermost portion 1023a and that the portion 1023a also serves as a means for selecting the axial position of the flywheel 1003. The periphery of the radially outermost portion 1023a of the cheek 1023 abuts the internal surface 1089.

The torque limiting unit 1074 further comprises a resilient element 1075, shown in the form of a diaphragm spring, which serves to furnish the force necessary to establish a required frictional engagement between the parts which are to turn relative to each other only when the magnitude of the torque reaches or exceeds a predetermined maximum permissible value. The diaphragm spring 1075 is stressed between the cheek 1022 and the portion 1003a of the secondary flywheel 1003. AS can be seen in FIG. 13, the spring 1075 reacts against the radially outer portion 1090 of the cheek 1022 and bears upon the adjacent protuberances 1091 of the portion 1003a. The protuberances 1091 are located radially outwardly of the portion 1090 of the cheek 1022. The properly stressed spring 1075 causes the surface 1087 to bear upon the radially outer portion 1023a of the cheek 1023 so that the parts 1003*b* and 1023 are maintained in requisite frictional engagement with each other.

A second frictional engagement is established between the diaphragm spring 1075 and the protuberances 1091. It is preferred to establish a form-locking connection between the diaphragm spring 1075 and the cheek 1022; this ensures that, if a slip is to take place in response to an undue increase of the applied torque, such slip will invariably entail an angular displacement of the portion 1003*a* and the diaphragm spring 1075 relative to each other.

FIG. 13 shows that the placing of the portion 1003*a* of the secondary flywheel between the cheeks 1022, 1023 of the output element 1021 of the damper 1008 contributes to compactness of the apparatus 1001 as seen in the axial direction of the flywheels. A reduction of the size of the apparatus 1001 in the radial direction of the flywheels 1002, 1003 is achieved by placing the rivets 1033 and the rivet heads 1084 at the same radial distance from the common axis of the flywheels. Additional savings in space, as seen radially of the flywheels, are achieved in that the energy storing devices 1007 are placed into immediate or close proximity of the fasteners 1019, and in that the bearing 1006 is installed radially inwardly of the annular array of the energy storing devices 1007. Furthermore, even the utilization of a journal bearing 1006, rather than a ball bearing, contributes to greater compactness of the apparatus 1001 as seen in the radial direction of the flywheels.

An important feature of the apparatus 1101 a portion of which is illustrated in FIG. 15 is that the secondary flywheel 1103 and the damper 1108 constitute a module which can be affixed to the primary flywheel 1102 to thus achieve additional savings in time of assembling and installing the apparatus in the power train of a motor vehicle. The damper 1108 comprises an input portion including or constituted by a flange 1120 having a radially outer portion provided with tapped bores 1190 for the externally threaded shanks of screws 1191 or analogous fasteners having heads abutting the outer side of the radially extending wall of the primary flywheel 1102. Thus, the heads of the fasteners 1191 are readily accessible for engagement by a suitable tool.

The module which is connected to the primary flywheel 1102 by the fasteners 1191 can further comprise a friction clutch 1151 and a clutch disc 1168. The manner in which the clutch disc 1168 can be centered in such module is not specifically shown in FIG. 15.

The module of FIG. 15 can be assembled with the bearing 1106 of the means for centering the flywheels 1102, 1103 relative to each other regardless of whether the module further includes the clutch 1151 and/or the clutch disc 1168. A fully assembled module is simply slipped onto the cylindrical part of the annular member 1115 which, in turn, is affixed to the primary flywheel 1102 in automatic response to the application of the fasteners 1119, i.e., in response to attachment of the primary flywheel to the rotary output component of a prime mover. The mounting of the flange 1120 on the primary flywheel 1102 (by means of the fasteners 1191) precedes attachment of the primary flywheel 1102 and annular portion 1115 to the output component of the prime mover.

However, it is also possible to attach the primary flywheel 1102 and the annular portion 1115 to the output component of the prime mover prior to application of fasteners 1191 which serve to connect the primary flywheel with the module including the secondary flywheel 1103 and normally also the friction clutch 1151 and the clutch disc 1168. Such mode of assembling the apparatus of FIG. 15 exhibits the important advantage that the cheek or cheeks of the output element of the damper 1108 and/or the clutch disc 1168 and/or the diaphragm spring and/or the housing of the clutch 1151 need not be provided with openings for manipulation of the fasteners 1119.

The apparatus of FIG. 15 further comprises a hysteresis device or hysteretic damping device 1140, preferably a device the operation of which is identical with or analogous to that of the previously described devices. The illustrated device 1140 comprises a friction ring 1144 as well as a resilient element 1145 shown in the form of a diaphragm spring which biases the friction ring 1144 in the axial direction of the flywheels. The device 1140 is to be mounted on the primary flywheel 1102 prior to application of the fasteners 1191. When the fasteners 1191 are properly applied to connect the primary flywheel 1102 with the aforediscussed module including the secondary flywheel 1103, the diaphagm spring 1145 is automatically stressed by parts 1144*a* which then urge the radially inner portion of the diaphragm spring 1145 against the adjacent portion of the primary flywheel 1102.

FIG. 16 shows a portion of a further apparatus 1201 having a hysteretic damping device 1240 which is mounted radially outwardly of the energy storing devices 1207 of the damper 1208 and axially between the cheeks 1222, 1223 of the output element 1221 of the damper. However, and as fully described in connection with the apparatus 601 of FIG. 9, the cheeks can be installed in such a way that they constitute the output element of the damper.

The device 1240 comprises a friction ring 1244 which can consist of an annulus of friction generating shoes and is in frictional engagement with the cheek 1223 on the one hand, and with a diaphragm spring 1245 (or an analogous energy storing element) on the other hand. The radially inner portion of the diaphragm spring 1245 abuts the cheek 1222 as seen in the axial direction of the primary and secondary flywheels 1202 and 1203.

A further energy storing resilient element in the form of a diaphragm spring 1275 is installed between the input element (flange) 1220 of the damper 1208 and the cheek 1222. The purpose of the diaphragm spring 1275 is to establish and maintain a continuous basic frictional engagement during each stage of angular movement of the flywheels 1202, 1203 and the input and output elements 1220, 1221 relative to each other.

The function of the friction ring 1244 (or of the shoes which constitute this friction ring) is the same as that described in connection with the member 44 in the apparatus 1 of FIGS. 1 and 2. Thus, the hysteretic damping device 1240 operates with a certain amount of play which is effective whenever the flywheel 1202 changes the direction of its angular movement relative to the flywheel 1203 and/or vice versa.

Figure 17:
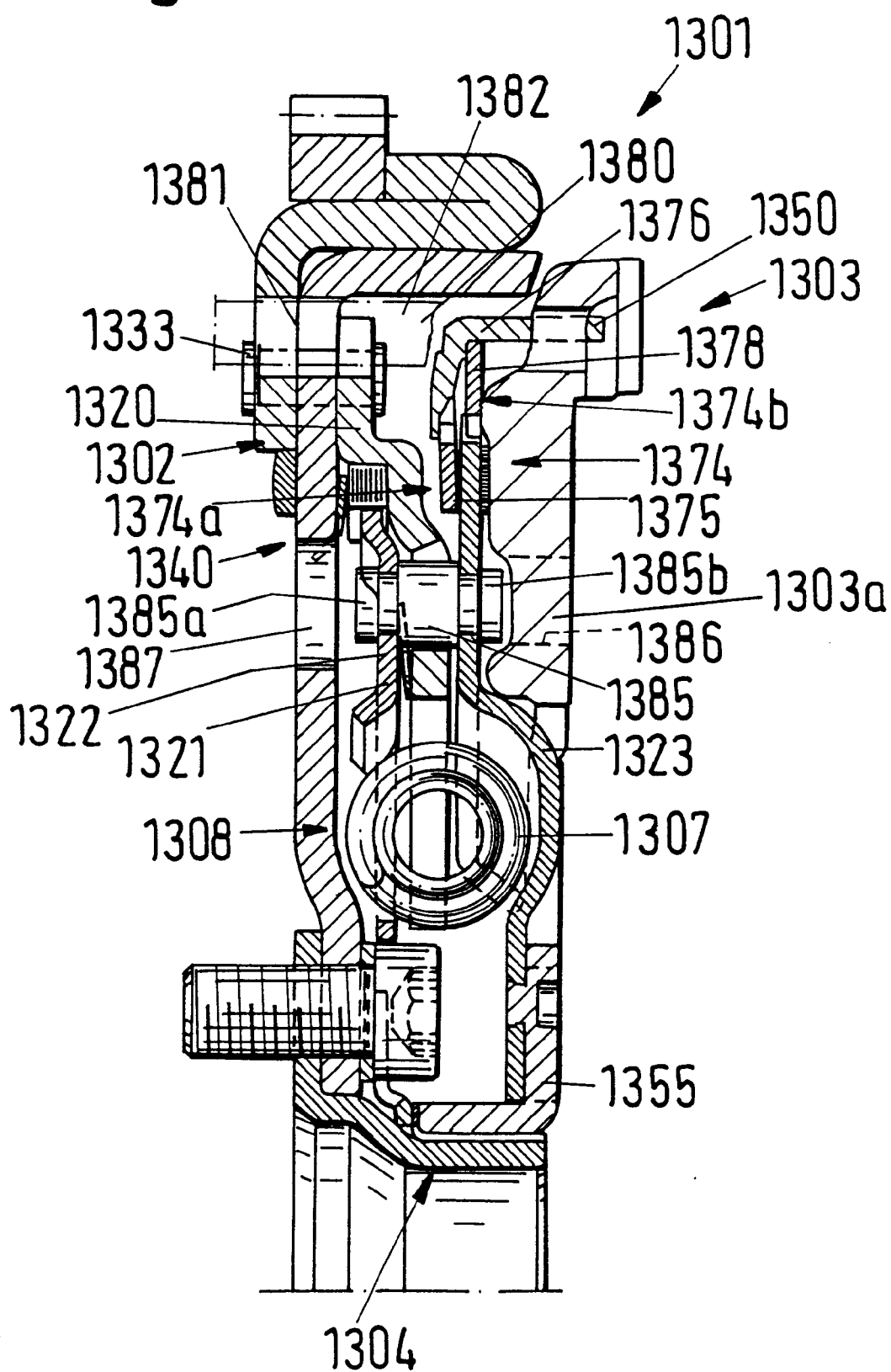
FIG. 17 is a similar fragmentary axial sectional view of certain details in still another torsional vibration damping apparatus.

Referring now to FIG. 17, there is shown a torsional vibration damping apparatus 1301 the operation of which is analogous to that of the apparatus 101, 201, 401 or 501. This applies particularly to the operation of the damper 1308 and the hysteretic damping device 1340.

The primary flywheel 1302 is made of metallic sheet material and is caused to remain coaxial with the secondary flywheel 1303 by a centering device or unit 1304 employing a journal bearing which contributes to a reduction of radial dimensions of the apparatus 1301.

The damper 1308 comprises an output element 1321 including two axially spaced-apart cheeks 1322, 1323. The cheek 1323 can transmit torque to the portion 1303*a* of the secondary flywheel 1303 by way of a slip clutch 1374 which constitutes a means for limiting the magnitude of the torque which the output element 1321 can transmit to the flywheel 1303. The mode of operation of the slip clutch 1374 is analogous to that of the slip clutch 674 in the apparatus 601 of FIG. 9 or of the slip clutch 974 in the apparatus 901 of FIG. 12.

More specifically, the slip clutch 1374 comprises a first stage 1374*a* and a second stage 1374*b*. Two resilient elements 1375 and 1378 of the slip clutch 1374 constitute diaphragm springs and correspond to the springs 675 and 678 in the slip clutch 674 of FIG. 9. The diaphragm spring 1375 is in direct frictional engagement with the annular portion 1303*a* of the secondary flywheel 1303 and with a member 1376 corresponding to the member 676 of the slip clutch 674. The member 1376 stresses the diaphragm spring 1375 as well as the other diaphragm spring 1378, i.e., the function of the member 1376 is clearly the same as or analogous to that of the cupped member 674 in the slip clutch 674 of FIG. 9.

An advantage of the apparatus 1301 of FIG. 17 is that its constituents can be assembled in a very simple, time-saving and hence efficient manner. Thus, the damper 1308 (including the input element or flange 1320, the output element 1321 including the cheeks 1322, 1323, and the energy storing devices 1307 can be assembled into a first module or partial module in a first series of steps. The assembly of such first module further involves the placing of the cupped member 1376 and at least one (1375) of the diaphragm springs 1375, 1378 axially between the cheek 1323 and the flange 1320. The thus assembled first module can be assembled with the primary flywheel 1302; this involves affixing the radially outer portion of the flange 1320 to the adjacent radially extending portion of the flywheel 1302 by means of the rivets 1333. It is clear that the rivets 1333 constitute but one form of fastener means which can be utilized to reliably secure the flange 1320 to the primary flywheel 1302.

It is clear that the hysteretic damping device 1340 must be installed between the axially offset portion of the flange 1320 and the adjacent portion of the radial wall of the primary flywheel 1302 before the flange 1320 is riveted to the primary flywheel. The part 1355 can be secured to the cheek 1323 before the making or application of the rivets 1333.

The thus obtained larger module or subunit includes at least the primary flywheel 1302, the hysteretic damping device 1340 and the damper 1308, as well as the cupped member 1376 and at least the diaphragm spring 1375 of the torque limiting slip clutch 1374. The making of the apparatus 1301 of FIG. 17 further involves fixedly connecting the cupped member 1376 with the portion 1303*a* of the secondary flywheel 2303; this is achieved by employing the rivets 1350. The rivets 1350 can but need not be identical with or analogous to the rivets which are shown in FIG. 13*a* and serve to connect the part 1059 of the primary flywheel 1002 with the cheek 1022.

The installation of the portion 1303*a* of the secondary flywheel 1303 in the apparatus 1301 of FIG. 17 must be preceded by insertion of the diaphragm spring 1378 and of friction rings (if any) to form part of the slip clutch 1374.

The next step involves assembly of the cupped part 1376 with the portion 1303*a* of the secondary flywheel in such a way that the already inserted diaphragm springs 1375, 1378 of the slip clutch 1374 are caused to store adequate amounts of energy. These amounts of energy must suffice to ensure adequate operation of the two stages 1374*a* and 1374*b* of the slip clutch 1374. FIG. 17 shows a suitable tool 1380 which engages one side of the member 1376, namely that side which faces away from the diaphragm springs 1375 and 1378. The plant in which the apparatus 1301 is assembled is equipped with discrete tools 1380 or with sets of such tools each of which can enter into engagement with the member 1376 by way of one of several access openings or holes 1381 in the primary flywheel 1302. A set of several tools 1380 can reliably prop the member 1376 to ensure that the portion 1303*a* can cause the springs 1375, 1378 to undergo the necessary deformation. Additional tool or tools (not shown) can be utilized to prop the portion 1303*a* in requisite position during the application of the rivets 1350. The making of the rivets 1350 can involve the utilization of suitable rivet forming tools in the form of rams or the like; the exact nature of such tools forms no part of the present invention.

It will be appreciated that the connection between the parts 1376 and 1303*a* can involve the utilization of fasteners other than the illustrated rivets 1350. For example, the member 1376 can be provided with axially parallel extensions (not shown) passing through suitable holes in the portion 1303*a* to the right-hand side of the portion 1303*a* (as viewed in FIG. 17) and adapted to be bent over selected regions of the portion 1303*a* or to be otherwise affixed to the portion 1303*a* in order to ensure that the parts 1376 and 1303*a* cooperate to maintain the diaphragm springs 1375, 1378 under requisite stress, i.e., to ensure satisfactory operation of the stages 1374*a* and 1374*b* of the slip clutch 1374. If utilized, the just discussed extensions of the member 1376 can be caused to extend radially outwardly or in any other direction which is necessary to establish a reliable connection with the portion 1303*a* of the secondary flywheel 1303.

Still further, it is possible to bond (e.g., weld by laser beams) the member 1376 to the portion 1303*a*; such bonding can be resorted to in addition to or in lieu of the utilization of the rivets 1350 or the like. The parts 1303*a*, 1376 can be directly or indirectly welded to each other, e.g., by employing connectors which are welded to such parts or which are welded to one of the parts 1303*a*, 1376 but otherwise affixed to the other part. For example, the connectors can include strips or the like made of metallic sheet material. All that counts is to ensure that the parts 1303*a*, 1376 can cooperate to guarantee adequate stressing of the diaphragm springs 1375 and 1378.

In accordance with still another procedure, the assembly of the apparatus 1301 can involve mounting the slip clutch 1374 (including the cheek 1323) on the annular portion 1303*a* of the secondary flywheel 1303, securing the flange 1320 to the primary flywheel 1302 (including installing the hysteretic damping device 1340 and the cheek 1322)- The next step involves insertion of the energy storing devices 1307 and the application of rivets 1385. Such mode of assembly is possible if the portion 1303*a* of the secondary flywheel is provided with openings 1386 (indicated by broken lines) to provide room for the application of the rivets 1385. Similar (properly aligned) openings 1387 are also provided or can be provided in the radially extending wall of the primary flywheel 1302. The openings 1386, 1387 render it possible to provide the rivets 1385 with suitable heads 1385*a*, 1385*b* which hold the cheeks 1322, 1323 at a requisite axial distance from each other.

Bolts and nuts can be utilized with advantage to establish certain connections in the apparatus of the present invention. For example, such types of fasteners can be utilized to secure the housing of a friction clutch to the secondary flywheel.

Still further, it is possible to weld the nuts to one of the parts which are to be connected to each other and to cause the shanks of the bolts to pass through suitable openings in the other part and to mesh with the nuts in order to establish simple separable connections between a housing and a flywheel or between other types of parts.

It is further clear that the hysteretic damping devices which are utilized in the torsional vibration damping apparatus of the present invention need not be designed to furnish a delayed damping action when the the direction of rotation of the primary and secondary flywheels relative to each other is reversed. Thus, the hysteretic damping device can remain effective during each and every stage of rotation of the flywheels with and relative to each other. For example, a hysteretic damping device can cooperate with at least one energy storing element which can effect an at least partial resetting of the friction generating element or elements of the hysteretic damping device in such a way that the damping action is not interrupted at any time including during reversal of the direction of rotation of the primary and secondary flywheels relative to each other.

It is also possible to design the hysteretic damping device in such a way that its frictional damping action varies gradually or otherwise in response to changes in angular positions of the flywheels relative to each other. Thus, and when one of the flywheels is caused to turn relative to the other flywheel from a predetermined starting position, the frictional resistance offered by the hysteretic damping device increases in accordance with a selected pattern, e.g., gradually. This can be achieved, for example, by resorting to suitable ramps which are provided on or form part of the friction generating elements of the hysteretic damping device.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torsional vibration damping apparatus and, therefore, such adaptations should and are intended to be comprehended within the meaning and range of equivalence of the appended claims.

What is claimed is:

1. Apparatus for damping torsional vibrations, comprising: input and output members arranged to carry out rotary movements with and relative to each other; and
    at least one damper operating between and arranged to oppose at least some rotary movements of said members relative to each other, said damper comprising at least one energy storing device,
    wherein said input and output members respectively comprise primary and secondary flywheels, said damper further comprising at least one input element receiving torque from said primary flywheel and an output element rotatable relative to said at least one input element and arranged to transmit torque to said secondary flywheel, said at least one energy storing device being interposed between portions of said at least one input element and said output element to yieldably oppose rotation of said at least one input element and said output element relative to each other,
    said apparatus further comprising a first torque transmitting connection between said input member and said at least one input element and a second torque transmitting connection between said output element and said output member, said at least one energy storing device being located at a smaller radial distance from said axis than either of said torque transmitting connections.

2. The apparatus of claim 1, wherein said input member comprises means for receiving torque from a prime mover and said output member comprises means for transmitting torque to a transmission of a power train in a motor vehicle.

3. The apparatus of claim 1, wherein said output member has a friction surface, and further comprising a friction clutch having a pressure plate, a clutch disc between said pressure plate and said friction surface, and means for moving said pressure plate relative to said friction surface to a plurality of positions in at least one of which said pressure plate causes said clutch disc to bear against said friction surface and thus receive torque from said output member.

4. The apparatus of claim 1, further comprising a frictional connection between at least one of said flywheels and the respective one of said input and output elements.

5. The apparatus of claim 1, further comprising a form-locking connection between one of said flywheels and the respective one of said input and output elements.

6. The apparatus of claim 1, wherein said flywheels are rotatable about a common axis and one of said torque transmitting connections is located at a different radial distance from said axis than the other of said connections.

7. The apparatus of claim 1, wherein said flywheels are rotatable about a common axis, and further comprising a frictional connection between one of said flywheels and the respective element of said damper and a form-locking connection between the other of said flywheels and the respective element of said damper, said form-locking connection being disposed at a smaller radial distance from said axis than said frictional connection.

8. The apparatus of claim 1, further comprising means for limiting the magnitude of torque which can be transmitted between said flywheels, said means for limiting comprising a frictional connection between one of said flywheels and the respective element of said damper.

9. The apparatus of claim 1, wherein said flywheels are rotatable about a common axis, and further comprising a prime mover having a rotary output component, and a torque transmitting connection between said component and the primary flywheel, said connection being located at a smaller radial distance from said axis than the at least one energy storing device.

10. The apparatus of claim 1, wherein said flywheels are rotatable about a common axis, further comprising means for fastening said input member to a rotary output component of a prime mover and means for centering said flywheels relative to each other, said centering means being located at a smaller radial distance from said axis than said fastening means.

11. The apparatus of claim 10, wherein said centering means includes a radial bearing.

12. The apparatus of claim 1, wherein said input and output elements are rotatable about a common axis, one of said input and output elements comprising two annular parts non-rotatably connected to each other and the other of said input and output elements comprising a disc-shaped part, at least a portion of said disc-shaped part being located between said annular parts as seen in the direction of said axis.

13. The apparatus of claim 12, further comprising means for centering said flywheels relative to each other, said centering means comprising a radial bearing including a portion of at least one of said annular parts.

14. The apparatus of claim 12, further comprising means for centering said input and output members relative to each other, said centering means comprising a bearing including a substantially cylindrical member constituting a radially inner portion of at least one of said annular parts and said disc-shaped part.

15. The apparatus of claim 1, further comprising means for centering said input and output members relative to each other for rotation about a common axis, said damper including a portion extending in the direction of said axis and forming part of said centering means.

16. The apparatus of claim 15, wherein said part of said centering means constitutes a separately produced part which is affixed to one of said input and output elements.

17. The apparatus of claim 1, wherein said flywheels are rotatable about a common axis, further comprising means for centering said input and output members relative to each other, at least one of said input and output members including a portion extending in the direction of said axis and forming part of said centering means.

18. The apparatus of claim 17, wherein said part is a separately produced part which is affixed to the flywheel of said at least one member.

19. The apparatus of claim 1, wherein said damper comprises a hysteretic damping device operating in parallel with said at least one energy storing device.

20. The apparatus of claim 19, wherein said hysteretic damping device includes a friction generating device.

21. The apparatus of claim 19, wherein said flywheels are rotatable about a common axis, said at least one energy storing device being located at a smaller radial distance from said axis than said hysteretic damping device.

22. The apparatus of claim 19, wherein said flywheels are rotatable about a common axis and said damper further comprises a first flywheel connection between said input element and the primary flywheel, and a second flywheel connection between said output element and the secondary flywheel, said first flywheel connection being located at a different radial distance from said axis than said second flywheel connection, and said hysteretic damping device being located at an intermediate radial distance from said axis between the distances of said flywheel connections.

23. The apparatus of claim 19, wherein said flywheels are rotatable about a common axis and said damper further comprises a first flywheel connection between said input element and the primary flywheel, and a second flywheel connection between said output element and the secondary flywheel, said hysteretic damping device being located at a greater radial distance from said axis than either of said flywheel connections.

24. The apparatus of claim 19, wherein said hysteretic damping device includes a friction generating device and said friction generating device is arranged to generate a hysteresis which varies in response to rotation of said input and output members relative to each other.

25. The apparatus of claim 1, wherein said input and output members are rotatable about a common axis, and further comprising means for fastening said input member to a rotary output component of a prime mover, said fastening means including a radially outer portion disposed at a predetermined radial distance from said axis, one of said input and output elements including two annular parts non-rotatably connected with each other and to one of said members, and the other of said input and output elements comprising a disc-shaped part disposed between said annular parts as seen in the direction of said axis and connected with the other of said members, said disc-shaped part including a radially innermost portion disposed at an equal or greater radial distance from said axis than said predetermined radial distance.

26. The apparatus of claim 25, wherein said disc-shaped part has at least one window for a portion of said at least one energy storing device, said at least one window being provided at said radially innermost portion of said disc-shaped part.

27. The apparatus of claim 26, wherein said at least one window has an open side confronting said axis.

28. The apparatus of claim 1, wherein said input and output members are rotatable about a common axis, and further comprising means for fastening said input member to a rotary output component of a prime mover, said fastening means including a radially outer portion disposed at a predetermined radial distance from said axis, one of said input and output elements including two annular parts non-rotatably connected with each other and to one of said members, and the other of said input and output elements comprising a disc-shaped part disposed between said annular parts as seen in the direction of said axis and connected with the other of said members, at least one of said annular parts including a radially innermost portion disposed at an equal or greater radial distance from said axis than said predetermined radial distance.

29. The apparatus of claim 1, wherein said input and output members are rotatable about a common axis, one of said input and output elements including two annular parts connected to each other and the other of said input and output elements including a disc-shaped part disposed between said annular parts as seen in the direction of said axis, at least one of said annular parts having at least one window for a portion of said at least one energy storing device.

30. The apparatus of claim 1, wherein said members are rotatable about a common axis, said input element comprises two annular parts and said output element comprises a disc-shaped part disposed between said annular parts as seen in the direction of said axis, said at least one energy storing device being located at a predetermined radial distance from said axis and said disc-shaped part having at least one opening extending circumferentially of said disc-shaped part at a greater radial distance from said axis greater than said predetermined distance, said damper further comprising fastener means extending through said opening and connecting said annular parts to each other.

31. The apparatus of claim 1, wherein said primary and secondary flywheels are rotatable about a common axis, further comprising means for fastening said first flywheel to a prime mover, one of said input and output elements including a disc-shaped part and said first flywheel comprising a wall extending substantially radially of said axis, said disc-shaped part having a radially outer portion and said damper further comprising fastener means securing said radially outer portion of said disc-shaped part to said wall, said wall and said disc-shaped part including portions which are spaced apart from each other in the direction of said axis and further comprising a hysteretic damping device at least a portion of which is disposed between said spaced-apart portions of said wall and said disc-shaped part.

32. The apparatus of claim 31, further comprising distancing means interposed between said wall and said disc-shaped part at least in the region of said fastener means.

33. The apparatus of claim 32, wherein said distancing means comprises an annular mass.

34. The apparatus of claim 1, wherein said primary and secondary flywheels are rotatable about a common axis, said damper further comprising a multi-stage torque limiting connection between one of said input and output elements and one of said flywheels.

35. The apparatus of claim 1, further comprising a module including the secondary flywheel, a pressure plate of a friction clutch arranged to be located adjacent said secondary flywheel, and a clutch disc arranged to be positioned between said secondary flywheel and said pressure plate, said damper further comprising an output element arranged to support said module.

36. The apparatus of claim 1, wherein said secondary flywheel is rotatable about a predetermined axis and has a friction surface disposed at a predetermined radial distance from said axis, and further comprising means for limiting the magnitude of the torque which said input member can transmit to said output member, said limiting means being spaced apart from said axis at a radial distance at least approximating said predetermined radial distance.

37. The apparatus of claim 1, wherein said secondary flywheel is rotatable about a predetermined axis, and further comprising a friction clutch connectable with said secondary flywheel and means for limiting the magnitude of the torque which is transmittable between said input and output members, said means for limiting comprising means for generating slip torque including a resilient element which is arranged to store energy in response to connection of said function clutch to said flywheel.

38. The apparatus of claim 37, wherein said resilient element comprises a diaphragm spring.

39. The apparatus of claim 1, wherein said primary and secondary flywheels are rotatable about a common axis, one of said flywheels having at least one opening and said damper further comprising means for fastening said output element to the other of said flywheels, said fastening means being accessible by way of said at least one opening.

40. The apparatus of claim 39, wherein said fastening means comprises at least one rivet.

41. The apparatus of claim 39, wherein said other of said flywheels is provided with a friction surface disposed at a predetermined radial distance from said axis, said at least one opening overlapping said friction surface as seen in the direction of said axis.

42. The apparatus of claim 1, wherein said primary and secondary flywheels are rotatable about a common axis, and further comprising a radial bearing disposed between said flywheels, means for fastening said first flywheel to a rotary output component of a prime mover disposed at a greater radial distance from said axis than said radial bearing, said at least one energy storing device being disposed at a greater radial distance from said axis than said means for fastening and further comprising means for limiting the magnitude of the torque which is transmittable between said members, a hysteretic damping device operating between said members, at least one of said limiting means and said hysteretic damping device being disposed at a greater radial distance from said axis than said energy storing device, and further comprising at least one axial extension provided on said first flywheel at a greater radial distance from said axis than either of said limiting means and said hysteretic damping device.

43. The apparatus of claim 1, wherein said input and output members are rotatable about a common axis, said primary flywheel having a radially outer portion including at least one annular mass having several layers of folded sheet material.

44. The apparatus of claim 43, wherein said sheet material is a metallic sheet material.

45. The apparatus of claim 43, wherein said flywheel further comprises a wall extending substantially radially of said axis and of one piece with said at least one mass.

46. The apparatus of claim 45, wherein said wall has at least one opening for fastening means arranged to affix said flywheel to a rotary output component of a prime mover.

47. The apparatus of claim 44, wherein said primary flywheel further comprises a second portion and means for securing said at least one mass to said second portion.

48. The apparatus of claim 1, wherein said input and output members are rotatable about a common axis and said primary flywheel is arranged to receive torque from a prime mover, said primary flywheel having a radially outer portion constituting an annular mass and further comprising a starter gear provided on said mass.

49. The apparatus of claim 48, wherein said starter gear is of one piece with said mass.

50. The apparatus of claim 1, wherein said input and output members are rotatable about a common axis and said primary flywheel is arranged to receive torque from an engine of a motor vehicle, said primary flywheel comprising a radially outer portion remote from said axis and including at least one mass provided with engine management indicia.

51. The apparatus of claim 50, wherein said indicia are of one piece with said at least one mass.

52. The apparatus of claim 1, wherein said primary and secondary flywheels are rotatable about a common axis, at least one of said flywheels being movable axially relative to the other of said flywheels and further comprising a hysteretic damping device arranged to operate in parallel with said at least one energy storing device and including at least one resilient element arranged to bias said at least one flywheel axially toward said other flywheel.

53. The apparatus of claim 52, wherein said at least one resilient element comprises a diaphragm spring.

54. The apparatus of claim 1, wherein said primary and secondary flywheels are rotatable about a common axis, said first flywheel being connectable with a rotary output component of a prime mover, further comprising a module including said second flywheel and said damper, said module being connectable with said first flywheel.

55. The apparatus of claim 54, wherein said module further comprises a friction clutch carried by said second flywheel and a clutch disc between said second flywheel and a pressure plate of said friction clutch.

56. The apparatus of claim 1, further comprising a hysteretic damping device operating in parallel with said at least one energy storing device and comprising at least one friction ring surrounded by a portion of one of said members.

57. The apparatus of claim 1, wherein said members are rotatable about a common axis and further comprising a hysteretic damping device arranged to operate in parallel with said at least one energy storing device and comprising friction generating elements, one of said members having an annular guide surface with a center at said axis and surrounding and guiding said friction generating elements.

58. The apparatus of claim 1, wherein said input and output members are rotatable about a common axis and one of said members is arranged to transmit torque to the other of said members, and further comprising a friction clutch having a housing and a spring and being carried by said output member, and means for limiting the magnitude of the torque which can be transmitted between said members, said limiting means comprising at least one resilient element which is stressed in the direction of said axis to assist the spring, and means for affixing said resilient element to said housing.

59. The apparatus of claim 58, wherein said at least one resilient element comprises a diaphragm spring.

60. The apparatus of claim 1, wherein said input and output members are rotatable about a common axis, said second flywheel having a friction surface facing away from and a side facing toward said first flywheel, and further comprising a module including said second flywheel, a friction clutch adjacent said friction surface and a clutch disc between said friction surface and said clutch, said clutch having a housing and further comprising fastener means arranged to secure said housing to one of said second flywheel and said damper and being accessible at said side of said second flywheel.

61. The apparatus of claim 60, wherein said fastener means comprises external threads and said housing has at least one tapped bore for said external threads.

62. The apparatus of claim 1, wherein said primary and secondary flywheels are rotatable about a common axis, said second flywheel having a friction surface facing away from said output element and a side facing said output element, and further comprising a module including said second flywheel, a friction clutch adjacent said friction surface and a clutch disc between said friction surface and said friction clutch, said clutch having a housing and further comprising fastener means arranged to secure said module to said output element, said fastener means being accessible at said friction surface of said second flywheel.

63. The apparatus of claim 62, wherein said fastener means includes threaded fasteners parallel to and remote from said axis.

64. The apparatus of claim 1, wherein said input and output members are rotatable about a common axis and said primary flywheel is connectable to a rotary output component of a prime mover, said input element having two annular parts adjacent said primary flywheel, said at least one energy storing device comprising first and second means for connecting at least one of said annular parts to said primary flywheel, said first connecting means being disposed at a greater radial distance from said axis greater than said energy storing element and said second connecting means being disposed at a smaller radial distance from said axis than said energy storing element.

65. The apparatus of claim 64, wherein said first connecting means comprises at least one rivet and said second connecting means is arranged to connect said primary flywheel to said output component.

66. The apparatus of claim 1, wherein said input and output members are rotatable about a common axis and said damper comprises an annular array of five energy storing devices spacedly surrounding said axis.

67. The apparatus of claim 66, wherein each of said energy storing devices is located at least substantially at the same radial distance from said axis.

68. The apparatus of claim 1, wherein said primary and secondary flywheels are rotatable about a common axis, further comprising a friction clutch adjacent to and receiving torque from said secondary flywheel and a torque limiting device operating between said output element and said secondary flywheel, said clutch being attachable to and detachable from said secondary flywheel and said torque limiting device comprising at least one resilient element which is stressed in the direction of said axis in response to attachment of said clutch to said secondary flywheel and which dissipates at least some energy in response to detachment of said clutch from said secondary second flywheel.

69. The apparatus of claim 68, wherein said at least one resilient element comprises a diaphragm spring.

70. Apparatus for damping torsional vibrations, comprising:
input and output members arranged to carry out rotary movements with and relative to each other; and
at least one damper operating between and arranged to oppose at least some rotary movements of said members relative to each other, said damper comprising at least one energy storing device,
wherein said input and output members respectively comprise primary and secondary flywheels, said damper further comprising at least one input element receiving torque from said primary flywheel and an output element rotatable relative to said at least one input element and arranged to transmit torque to said secondary flywheel, said at least one energy storing device being interposed between portions of said at least one input element and said output element to yieldably oppose rotation of said at least one input element and said output element relative to each other,
said apparatus further comprising a first torque transmitting connection between said input member and said at least one input element and a second torque transmitting connection between said output element and said output member, said at least one energy storing device being located at a first radial distance from said axis and each of said connections being located at a greater second radial distance from said axis,
where, in said apparatus, said flywheels are rotatable about a common axis, the apparatus further comprising means for fastening said input member to a rotary output component of a prime mover, and means for centering said flywheels relative to each other, said centering means being located at a third radial distance from said axis and said fastening means being located at a greater fourth radial distance from said axis.

71. Apparatus for damping torsional vibrations, comprising:
input and output members arranged to carry out rotary movements with and relative to each other; and
at least one damper operating between and arranged to oppose at least some rotary movements of said members relative to each other, said damper comprising at least one energy storing device,
wherein said input and output members respectively comprise primary and secondary flywheels, said damper further comprising at least one input element receiving torque from said primary flywheel and an output element rotatable relative to said at least one input element and arranged to transmit torque to said secondary flywheel, said at least one energy storing device being interposed between portions of said at least one input element and said output element to yieldably oppose rotation of said at least one input element and said output element relative to each other,
said apparatus further comprising a first torque transmitting connection between said input member and said at least one input element and a second torque transmitting connection between said output element and said output member, said at least one energy storing device being located at a first radial distance from said axis and each of said connections being located at a greater second radial distance from said axis,
where, in said apparatus, said flywheels are rotatable about a common axis, the apparatus further comprising means for fastening said input member to a rotary output component of a prime mover, said fastening means including a radially outer portion disposed at a predetermined radial distance from said axis, said energy storing device including a radially innermost portion disposed at a third radial distance from said axis and said predetermined radial distance approximating said third radial distance.

72. The apparatus of claim 71, wherein said energy storing device comprises at least one coil spring.

73. Apparatus for damping torsional vibrations, comprising:

input and output members arranged to carry out rotary movements with and relative to each other; and at least one damper operating between and arranged to oppose at least some rotary movements of said members relative to each other, said damper comprising at least one energy storing device, where, in said apparatus, said input and output members are rotatable about an axis, said apparatus further comprising means for fastening said input member to a rotary output component of a prime mover, said fastening means including a radially outer portion disposed at a predetermined radial distance from said axis and said damper further comprising an input element and an output element, one of said elements including at least one annular part connected to one of said members, and the other of said elements comprising at least one disc-shaped part connected with the other of said members, at least one of said parts including a radially innermost portion disposed at a second radial distance from said axis and said predetermined radial distance approximating said second radial distance, where, further in said apparatus, said at least one of said parts has at least one window for a portion of said at least one energy storing device, said at least one window being provided at said radially innermost portion of said at least one of said parts, and wherein further said at least one window has an open side confronting said axis.

74. Apparatus for damping torsional vibrations comprising:

input and output members arranged to carry out rotary movements with and relative to each other; and at least one damper operating between and arranged to oppose at least some rotary movements of said members relative to each other, said damper comprising at least one energy storing device, where, in said apparatus, said input and output members are rotatable about an axis, said apparatus further comprising means for fastening said input member to a rotary output component of a prime mover, said fastening means including a radially outer portion disposed at a first radial distance from said axis and said damper further comprising an input element and an output element, one of said elements including at least one annular part connected to one of said members, and the other of said elements comprising at least one disc-shaped part connected with the other of said members, at least one of said parts including a radially innermost portion disposed at a greater second radial distance from said axis, where, further in said apparatus, said at least one of said parts has at least one window for a portion of said at least one energy storing device, said at least one window being provided at said radially innermost portion of said at least one of said parts, and wherein further said at least one window has an open side confronting said axis.

75. Apparatus for damping torsional vibrations, comprising:

input and output members arranged to carry out rotary movements with and relative to each other; and at least one damper operating between and arranged to oppose at least some rotary movements of said members relative to each other, said damper comprising at least one energy storing device, said apparatus further comprising a hysteretic damping device operating between said members in parallel with said at least one energy storing device, where, in said apparatus, said members are rotatable about a common axis and said damper further comprises an input element, a first connection between said input element and the input member, an output element, and a second connection between said output element and the output member, said first connection being located at a different radial distance from said axis than said second connection, and said hysteretic damping device being located at an intermediate radial distance from said axis between the respective distances of said first and second connections, said at least one energy storing device being located at a smaller radial distance from said axis than either of said first and second connections.

76. The apparatus of claim 75, wherein the hysteretic damping device has a range of rotary play.

77. Apparatus for damping torsional vibrations, comprising:

input and output members arranged to carry out rotary movements with and relative to each other; and at least one damper operating between and arranged to oppose at least some rotary movements of said members relative to each other, said damper comprising at least one energy storing device, wherein said input and output members respectively comprise primary and secondary flywheels rotatable about a common axis, said apparatus further comprising means for fastening said primary flywheel to a prime mover, said damper further comprising an input element and an output element, one of said elements including a disc-shaped part and said primary flywheel comprising a wall extending substantially radially of said axis, said disc-shaped part having a radially outer portion and said damper further comprising fastener means securing said radially outer portion of said disc-shaped part to said wall, said wall and said disc-shaped part including portions which are spaced apart from each other in the direction of said axis and further comprising a hysteretic damping device at least a portion of which is disposed between said spaced-apart portions of said wall and said disc-shaped part.

* * * * *

UNITED STATES PATENT AND TRADEMARK OFFICE
Certificate

Patent No. 6,213,270 B1                                     Patented: April 10, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Johann Jäckel, Baden-Baden; Wolfgang Reik, Bühl; Hartmut Mende, Sinzheim; Bernd Brunsch, Dreieich; Dietmar Schultz, Karlsruhe; all of Federal Republic of Germany.

Signed and Sealed this Twenty-Second Day of July 2003.

CHARLES A. MARMOR
*Supervisory Patent Examiner*
Art Unit 3681